United States Patent
Paladugu et al.

(10) Patent No.: US 12,464,434 B2
(45) Date of Patent: Nov. 4, 2025

(54) SIDELINK RELAY ROUTING OPTIONS FOR TRANSMISSION OF DATA FROM WIRELESS COMMUNICATION DEVICE TO NETWORK

(71) Applicant: QUALCOMM Incorporated, San Diego, CA (US)

(72) Inventors: Karthika Paladugu, San Diego, CA (US); Hong Cheng, Basking Ridge, NJ (US); Gavin Bernard Horn, La Jolla, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 17/922,107

(22) PCT Filed: May 5, 2021

(86) PCT No.: PCT/US2021/030872
§ 371 (c)(1),
(2) Date: Oct. 28, 2022

(87) PCT Pub. No.: WO2021/231150
PCT Pub. Date: Nov. 18, 2021

(65) Prior Publication Data
US 2023/0171671 A1 Jun. 1, 2023

(30) Foreign Application Priority Data
May 12, 2020 (GR) .............................. 20200100247

(51) Int. Cl.
*H04W 40/22* (2009.01)
*H04W 92/18* (2009.01)

(52) U.S. Cl.
CPC ............ *H04W 40/22* (2013.01); *H04W 92/18* (2013.01)

(58) Field of Classification Search
CPC ....... H04W 40/22; H04W 92/18; H04W 4/00; H04W 4/14; H04W 8/00; H04W 72/00;
(Continued)

(56) References Cited

U.S. PATENT DOCUMENTS 10,602,550 B2 * 3/2020 Burbidge .............. H04W 76/10
10,820,185 B2 * 10/2020 Faccin .................. H04W 76/27
(Continued)

FOREIGN PATENT DOCUMENTS

CN 102282807 B 12/2013
CN 110035461 A 7/2019
(Continued)

OTHER PUBLICATIONS

International Search Report and Written Opinion—PCT/US2021/030872—ISA/EPO—Sep. 3, 2021.
(Continued)

*Primary Examiner* — Man U Phan
(74) *Attorney, Agent, or Firm* — Loza & Loza LLP

(57) ABSTRACT

In one aspect, a remote device generates data for transmission to a network based on an application, selects one of a set of data routing options for routing the data to the network based on policy control information; each of the set of data routing options includes routing the data via a relay device; and transmits the data to the relay device for routing the data via the selected data routing option. In another aspect, a relay establishes a protocol data unit (PDU) session with a network for relaying data received from a remote device based on policy control information, receives data from the remote device, and transmits the data to a base station coupled to the network via the PDU session. Another aspect relates to the base station operation with respect to the above aspects.

32 Claims, 21 Drawing Sheets

(58) Field of Classification Search
CPC ..... H04W 72/04; H04W 72/23; H04W 76/14; H04W 88/04; H04L 47/20; H04L 47/04; H04L 29/08; H04L 67/02; H04L 12/81; H04L 1/18
USPC .......................................................... 370/329
See application file for complete search history.

(56) References Cited

U.S. PATENT DOCUMENTS

| | | | |
|---|---|---|---|
| 10,893,557 B2* | 1/2021 | Gulati | H04B 7/15542 |
| 11,160,134 B2* | 10/2021 | Kim | H04W 76/18 |
| 11,362,955 B2* | 6/2022 | Chin | H04L 47/20 |
| 11,611,865 B2* | 3/2023 | Faccin | H04W 48/18 |
| 11,765,616 B2* | 9/2023 | Zhang | H04W 28/0263 370/229 |
| 11,812,512 B2* | 11/2023 | Paladugu | H04W 80/10 |
| 12,035,391 B2* | 7/2024 | Back | H04W 8/005 |
| 12,108,494 B2* | 10/2024 | Paladugu | H04W 4/14 |
| 2018/0324577 A1 | 11/2018 | Faccin et al. | |
| 2020/0007450 A1 | 1/2020 | Chin et al. | |
| 2022/0361267 A1* | 11/2022 | Wang | H04W 76/14 |
| 2023/0247513 A1* | 8/2023 | Paladugu | H04W 88/04 370/315 |
| 2024/0163959 A1* | 5/2024 | Cheng | H04W 76/14 |

FOREIGN PATENT DOCUMENTS

| | | |
|---|---|---|
| CN | 111034336 A | 4/2020 |
| WO | 2017099828 A1 | 6/2017 |

OTHER PUBLICATIONS

KYOCERA: "Consideration of the L2 Relay Bearer Modelling", 3GPP Draft, 3GPP TSG-RAN WG2 #96, R2-168397 Relay Bearer Modelling, 3RD Generation Partnership Project (3GPP), Mobile Competence Centre, 650, Route Des Lucioles, F-06921 Sophia-Antipolis Cedex, France, vol. RAN WG2, No. Reno, USA, Nov. 14, 2016-Nov.18, 2016 Nov. 5, 2016 (Nov. 5, 2016), XP051193026, 4 Pages, p. 1-p. 3, figure 1.

Qualcomm Incorporated: "Network Coverage Using L3-Based UE-to-Network Relays", 3GPP Draft, 3GPP TSG-RAN WG2 Meeting #89Bis, R2-151510-UE to NW Relay V1, 3rd Generation Partnership Project (3GPP), Mobile Competence Centre, 650, Route Des Lucioles, F-06921 Sophia-Antipolis Cedex, France, vol. RAN WG2, No. Bratislava, Slovakia, Apr. 20, 2015-Apr. 24, 2015, Apr. 19, 2015 (Apr. 19, 2015), XP050936432, 6 Pages, p. 1-p. 4, figure 7.2.1.2.1, 7.2.2.1.

Huawei, et al., "Solution for the KI: Support Direct Communication Path Selection and Switching Between PC5 and Uu", SA WG2 Meeting #136, S2-1911667 (Revision of S2-191xxxx), Reno, NV, USA, Nov. 18, 2019-Nov. 22, 2019, pp. 1-5, Nov. 9, 2019.

* cited by examiner

SIDELINK RELAY ROUTING OPTIONS FOR TRANSMISSION OF DATA FROM WIRELESS COMMUNICATION DEVICE TO NETWORK

CROSS-REFERENCE TO RELATED APPLICATIONS

This application is the U.S. national stage of PCT patent application number PCT/US21/30872 filed on May 5, 2021, which claims the benefit of the filing date of Greek patent application, Ser. No. 20/200,100247, filed on May 12, 2020, which is incorporated herein by reference.

TECHNICAL FIELD

The technology discussed below relates generally to wireless communication networks, and more particularly, to sidelink relay routing options for transmission of data from a wireless communication device (e.g., user equipment (UE)) to a network.

BACKGROUND

Wireless communication between devices may be facilitated by various network configurations. In one configuration, a cellular network may enable wireless communication devices (e.g., user equipment (UEs)) to communicate with one another through signaling with a nearby base station or cell. Another wireless communication network configuration is a device to device (D2D) network, in which wireless communication devices may signal one another directly, rather than via an intermediary base station or cell. For example, D2D communication networks may utilize sidelink signaling to facilitate the direct communication between wireless communication devices. In some sidelink network configurations, wireless communication devices may further communicate in a cellular network, generally under the control of a base station. Thus, the wireless communication devices may be configured for uplink and downlink signaling via a base station and further for sidelink signaling directly between the wireless communication devices without transmissions passing through the base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a first wireless communication device is disclosed. The first wireless communication device includes a wireless transceiver, a memory, and a processor communicatively coupled to the wireless transceiver and the memory. The processor and the memory may be configured to generate data for transmission to a network based on an application. The processor and the memory may be further configured to select one of a set of data routing options as a selected data routing option for routing the data to the network based on policy control information, wherein each of the set of data routing options includes routing the data to the network via a second wireless communication device. Additionally, the processor and the memory may be configured to transmit the data to the second wireless communication device using the wireless transceiver for routing the data via the selected data routing option.

Another example provides a method for wireless communication at a first wireless communication device. The method includes generating data for transmission to a network based on an application, and selecting one of a set of data routing options for routing the data to the network based on policy control information. Each of the set of data routing options includes routing the data via a second wireless communication device. The method further includes transmitting the data to the second wireless communication device for routing the data via the selected data routing option.

Another example provides a first wireless communication device. The first wireless communication device includes means for generating data for transmission to a network based on an application, and means for selecting one of a set of data routing options for routing the data to the network based on policy control information. Each of the set of data routing options includes routing the data via a second wireless communication device. The first wireless communication device further includes means for transmitting the data to the second wireless communication device for routing the data via the selected data routing option.

Another example provides article of manufacture for use by a first wireless communication device. The article of manufacture includes a computer-readable medium having stored therein instructions executable by one or more processors of the first wireless communication device to generate data for transmission to a network based on an application, and select one of a set of data routing options for routing the data to the network based on policy control information. Each of the set of data routing options includes routing the data via a second wireless communication device. The instructions executable by the one or more processors of the first wireless communication device to further transmit the data to the second wireless communication device for routing the data via the selected data routing option.

Another example provides a first wireless communication device. The first wireless communication device includes a wireless transceiver, a memory, and a processor communicatively coupled to the wireless transceiver and the memory. The processor and the memory may be configured to establish a protocol data unit (PDU) session with a network for relaying data received from a second wireless communication device based on policy control information, receive data from the second wireless communication device using the wireless transceiver, and transmit the data to a base station coupled to the network via the PDU session using the wireless transceiver.

Another example provides a method for wireless communication at a first wireless communication device. The method includes establishing a protocol data unit (PDU) session with a network for relaying data received from a second wireless communication device based on policy control information, receiving data from the second wireless communication device, and transmitting the data to a base station coupled to the network via the PDU session.

Another example provides a first wireless communication device. The first wireless communication device includes means for establishing a protocol data unit (PDU) session with a network for relaying data received from a second wireless communication device based on policy control information, means for receiving data from the second wireless communication device, and means for transmitting the data to a base station coupled to the network via the PDU session.

Another example provides article of manufacture for use by a first wireless communication device. The article of manufacture includes a computer-readable medium having stored therein instructions executable by one or more processors of the first wireless communication device to establish a protocol data unit (PDU) session with a network for relaying data received from a second wireless communication device based on policy control information, receive data from the second wireless communication device, and transmit the data to a base station coupled to the network via the PDU session.

Another example provides a base station. The base station includes a wireless transceiver, a memory, and a processor communicatively coupled to the wireless transceiver and the memory. The processor and the memory may be configured to establish a protocol data unit (PDU) session with a first wireless communication device and a network device for receiving data from the first wireless communication device and forwarding the data to the network device, and receive data from the first wireless communication device via the PDU session using the wireless transceiver. The data originates from a second wireless communication device. The processor and the memory may be further configured to transmit the data to the network device via the PDU session using the network interface.

Another example provides a method for wireless communication implemented at a base station. The method includes establishing a protocol data unit (PDU) session with a first wireless communication device and a network device for receiving data from the first wireless communication device and forwarding the data to the network device, and receiving data from the first wireless communication device via the PDU session. The data originates from a second wireless communication device. The method further includes transmitting the data to the network device via the PDU session.

Another example provides a base station. The base station includes means for establishing a protocol data unit (PDU) session with a first wireless communication device and a network device for receiving data from the first wireless communication device and forwarding the data to the network device, and means for receiving data from the first wireless communication device via the PDU session. The data originates from a second wireless communication device. The base station further includes means for transmitting the data to the network device via the PDU session.

Another example provides article of manufacture for use by a base station. The article of manufacture includes a computer-readable medium having stored therein instructions executable by one or more processors of the base station to establish a protocol data unit (PDU) session with a first wireless communication device and a network device for receiving data from the first wireless communication device and forwarding the data to the network device, and receive data from the first wireless communication device via the PDU session. The data originates from a second wireless communication device. The instructions executable by the one or more processors of the base station to further transmit the data to the network device via the PDU session.

Another example provides a first wireless communication device. The first wireless communication device includes a wireless transceiver, a memory, and a processor communicatively coupled to the wireless transceiver and the memory. The processor and the memory are configured to generate data for transmission based on an application, select one of a set of data routing options for routing the data to a second wireless communication device based on policy control information; and transmit the data to the second wireless communication device using the wireless transceiver.

Another example provides a method for wireless communication implemented at a first wireless communication device. The method includes generating data for transmission based on an application, selecting one of a set of data routing options for routing the data to a second wireless communication device based on policy control information, and transmitting the data to the second wireless communication device.

Another example provides a first wireless communication device. The first wireless communication device includes means for generating data for transmission based on an application, means for selecting one of a set of data routing options for routing the data to a second wireless communication device based on policy control information, and means for transmitting the data to the second wireless communication device.

Another example provides article of manufacture for use by a first wireless communication device. The article of manufacture includes a computer-readable medium having stored therein instructions executable by one or more processors of the first wireless communication device to generate data for transmission based on an application; select one of a set of data routing options for routing the data to a second wireless communication device based on policy control information; and transmit the data to the second wireless communication device.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Figure 1:
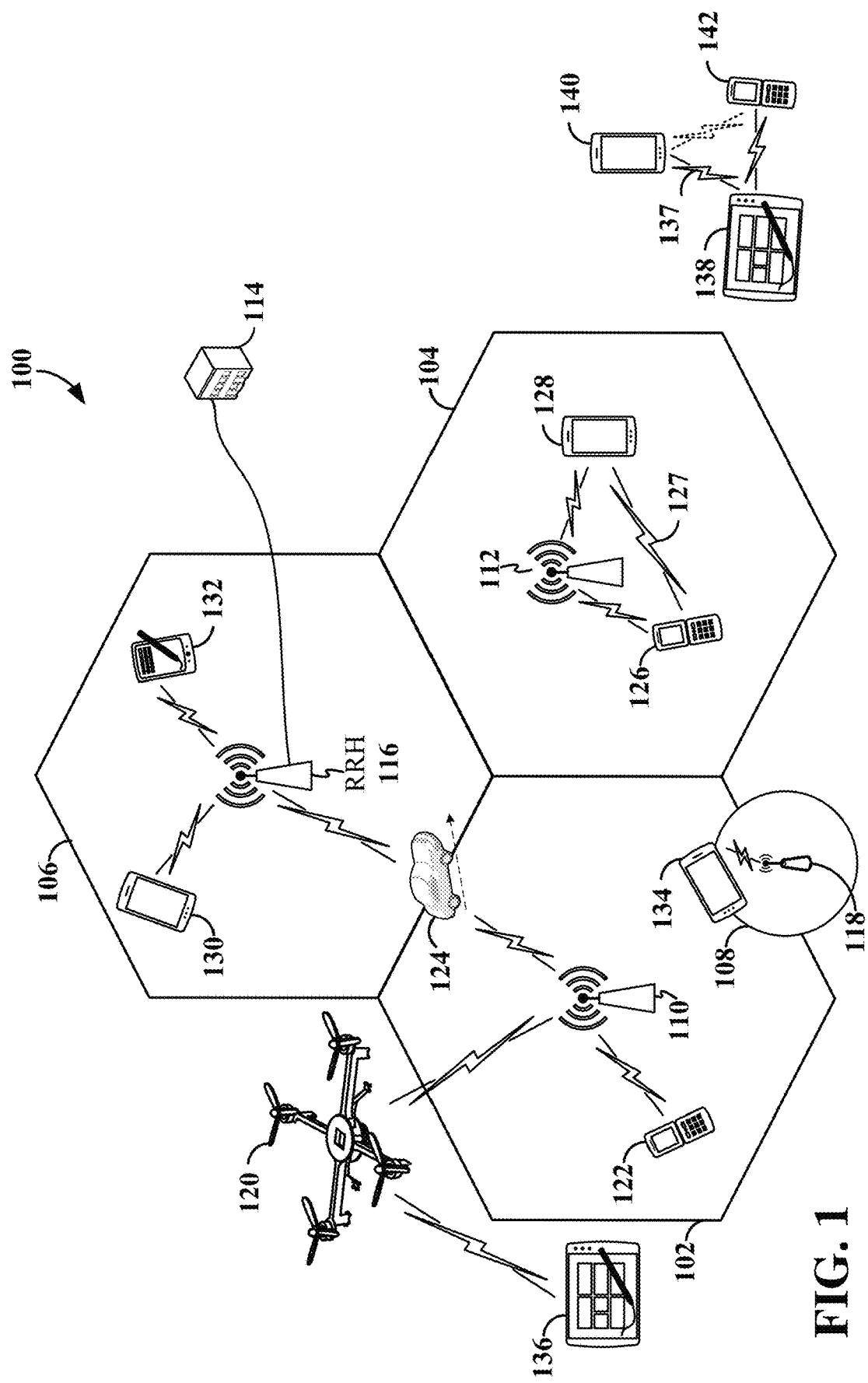
FIG. 1 is a diagram illustrating an example of a wireless radio access network according to some aspects.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
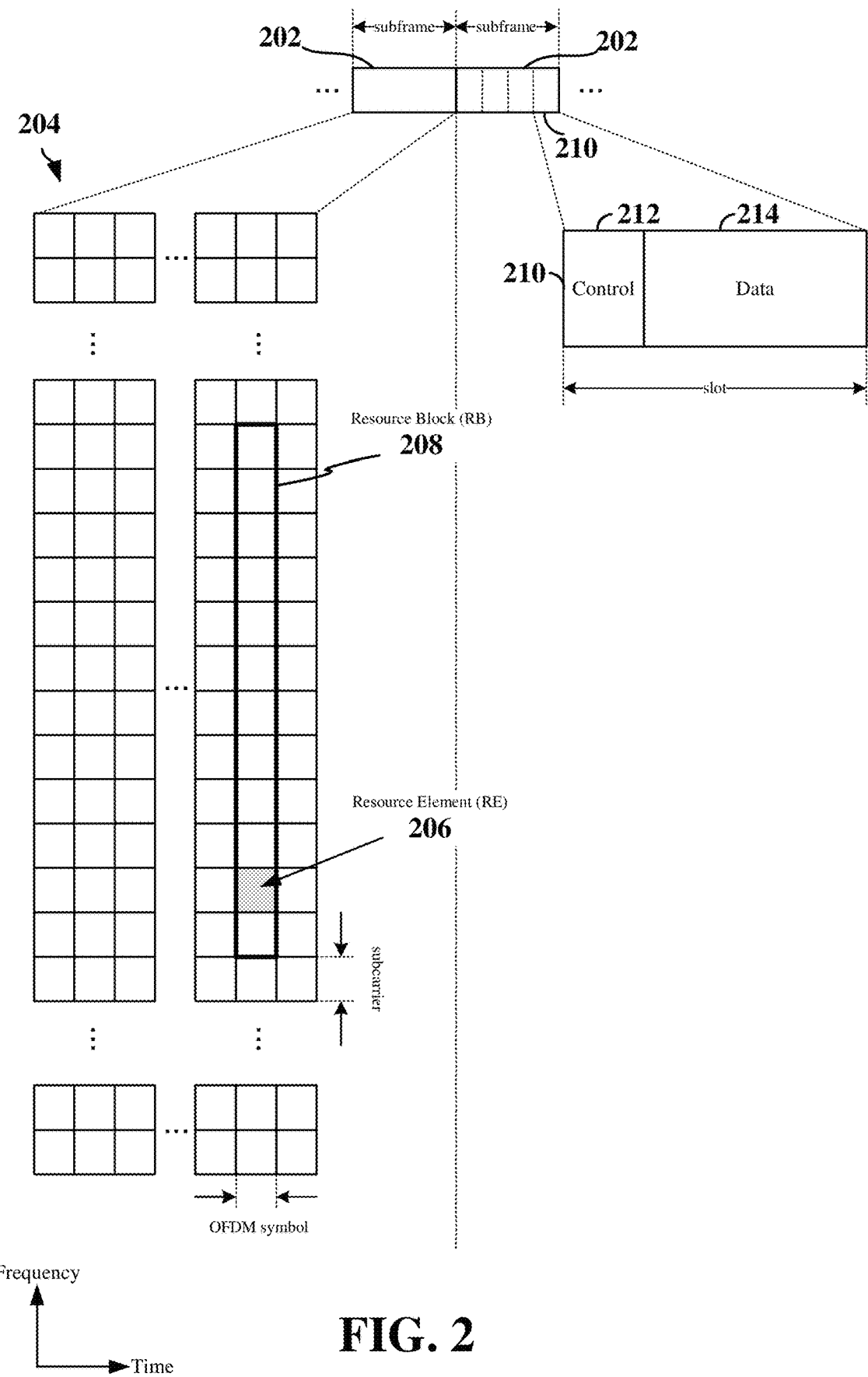
FIG. 2 is a diagram illustrating an example of a frame structure for use in a wireless communication network according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
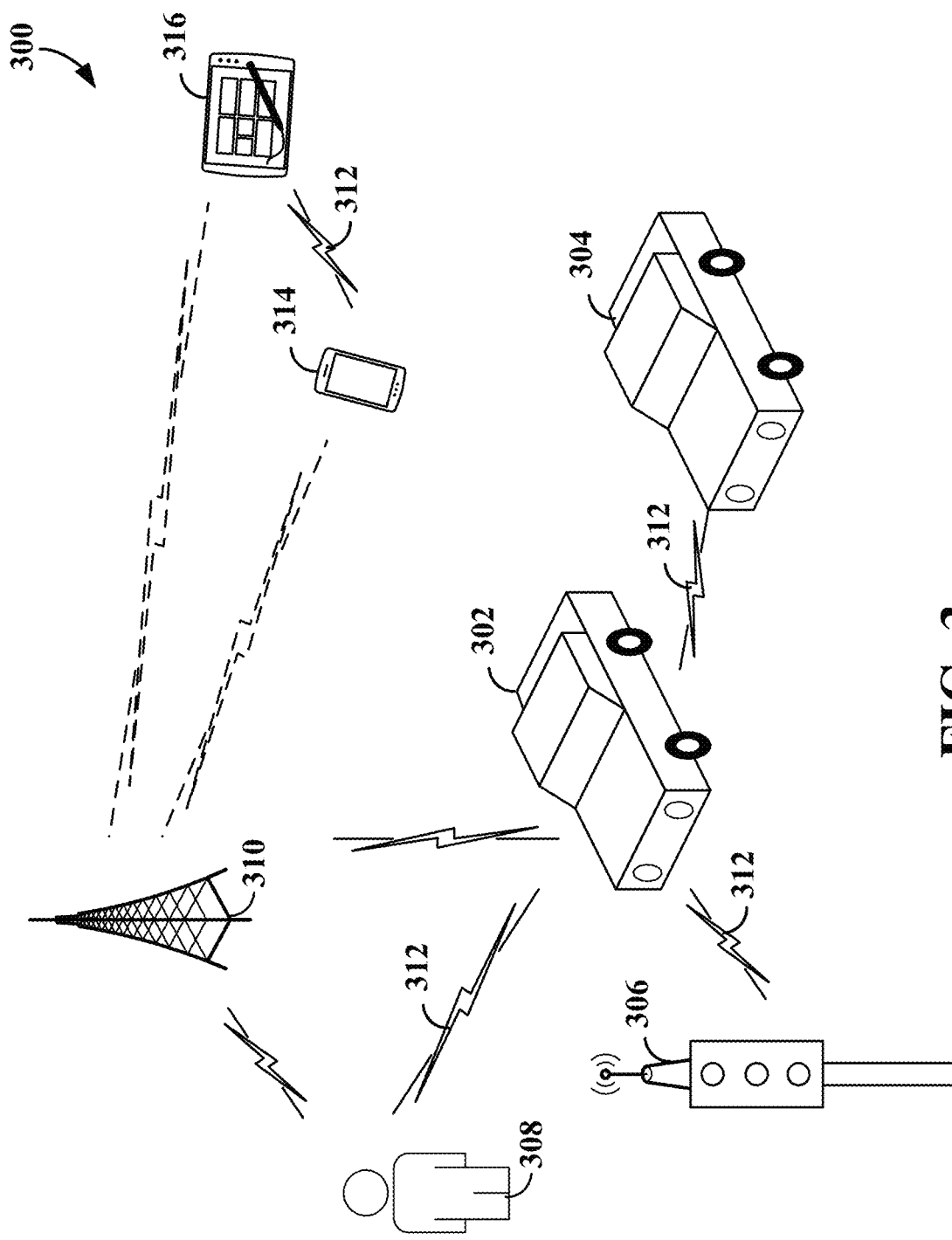
FIG. 3 is a diagram illustrating an example of a wireless communication network employing sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. The base station 310 may further activate preconfigured sidelink grants (e.g., configured grants) for sidelink communication among the sidelink devices. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

Figure 4:
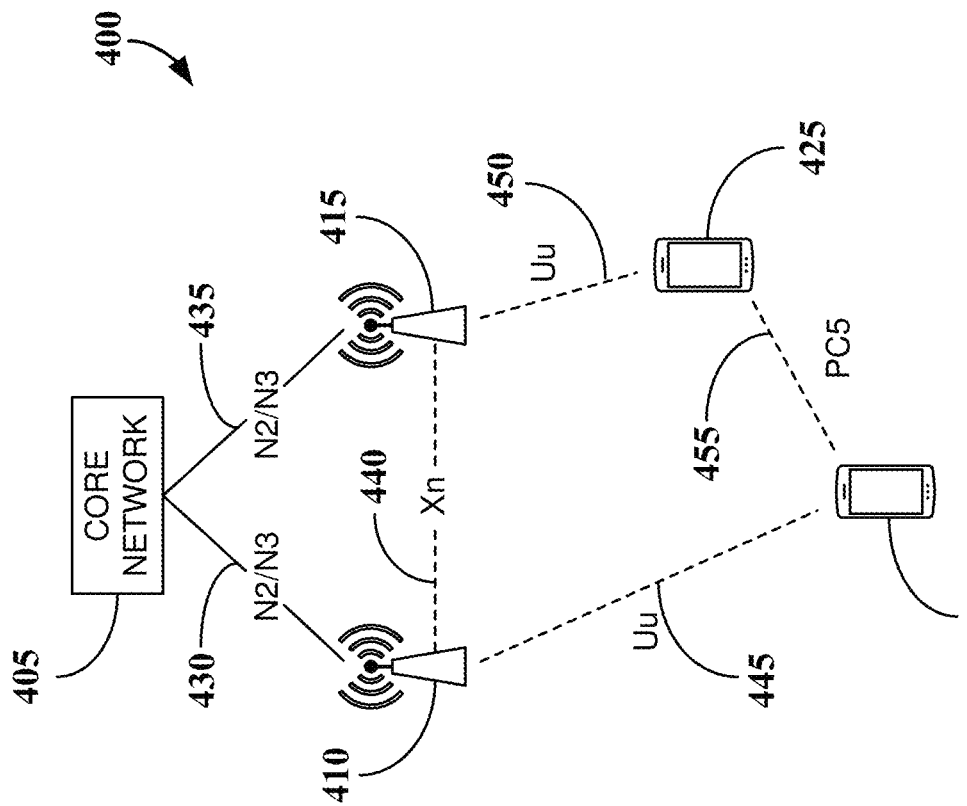
FIG. 4 is a block diagram illustrating a wireless communication system supporting remote wireless communication device communication to a network via at least one relay wireless communication device according to some aspects.

FIG. 4 is a block diagram illustrating a wireless communication system 400 supporting remote wireless communication device communication to a network via at least one relay wireless communication device according to some aspects. The wireless communication system 400 includes a remote wireless communication device 420 (e.g., a UE), a relay wireless communication device 425 (e.g., a UE), a first base station (e.g., a gNB) 410, a second base station 415 (e.g., a gNB), and a core network 405 (e.g., 5G NR network).

The remote wireless communication device 420 may be communicatively coupled to the first base station 410 via a cellular link 445 (e.g., Uu). Similarly, the relay wireless communication device 425 may be communicatively coupled to the second base station 415 via a cellular link 450 (e.g., Uu). In the examples described herein, the remote and relay wireless communication devices 420 and 425 may be communicatively coupled with each other via a sidelink 455 (e.g., PC5). However, it shall be understood that the remote and relay wireless communication devices 420 and 425 may be communicatively coupled with each other via other types of links, such as via WiFi or Bluetooth. The first and second base stations 410 and 415 may be communicatively coupled via a signaling link 440 (e.g., Xn). The first base station 410 is coupled to the core network 405 via a control plane (e.g., N2) and user plane (e.g., N3) links (collectively, 430). Similarly, the second base station 415 is coupled to the core network 405 via a control plane (e.g., N2) and user plane (e.g., N3) links (collectively, 435).

In many cases, the remote wireless communication device 420 uses the cellular link 445 to send traffic or user plane data to the core network 405 via the first base station. However, in some situations, the cellular link 445 between the remote wireless communication device 420 and the first base station 410 may be compromised (e.g., due to interference, noise, small signal-to-noise (SNR) ratio, equipment failure, etc.) for all services or some services. In such situations, the remote wireless communication device 420 may seek to send data to the core network 405 via the relay wireless communication device 425. In such case, the data is transmitted from the remote wireless communication device 420 to the relay wireless communication device 425 via the sidelink 455; the relay wireless communication device 425, in turn, relays the data to the second base station 415 via the cellular link 450; and the base station 415 forwards the data to the core network 405 via the user plane (e.g., N3) link 435.

The 5G NR specification includes policy control information for use by wireless communication devices to control how data may be routed to the core network 405 based on some criteria. Some of the policy control information is included in an Access Network Discovery & Selection Policy (ANDSP) specification. The ANDSP specification provides rules for wireless communication devices for routing data to the core network 405 using a non-3GPP access network (e.g., a WiFi network). Other policy control information is included in a UE route selection policy (URSP) specification. The URSP specification provides rules on how wireless communication devices are to route data via 3GPP and non-3GPP networks based on the particular application generating the data (e.g., voice call, social media, gaming, etc.), and the characteristics associated with the data routing session. The URSP specification may provide a traffic descriptor that specifies relay operation including a route selection descriptor that would specify protocol data unit (PDU) session parameters.

Still other policy control information provides rules on how to route data between wireless communication devices (outside of the 5G NR network) via proximity services (ProSe) sidelink communications. The ProSe policy is typically tailored for public safety services (e.g., fire fighters, police, first responders, etc.), as well as certain commercial applications, such as interactive gaming. The aforementioned policy control information lacks data routing rules when it comes to routing data from a remote wireless communication device (e.g., device 420) to the core network 405 via one or more other relay wireless communication devices (e.g., device 425). Here device 420 is referred to as the "remote" device because it originates the data to be transmitted to the core network 405, and the other device 425 is referred to as the "relay" device as it relays the data from the remote device 420 to the core network 405 via its cellular link 450 to the second base station 415.

The policy control information enhancements provide rules for three (3) types of relay data routing options. First, there is a layer 3 (L3) relay data routing option, in which the routing of data is from the remote wireless communication device 420 to the core network 405 via the sidelink 455, relay wireless communication device 425, the cellular link 450, the second base station 415, and the user plane (N3) link 435 via an internet protocol (IP) or L3 routing.

Second, there is a layer 3 (L3) relay with non-$3^{rd}$ Generation Partnership Project (3GPP) Interworking Function (N3IWF) data routing option, in which the routing of data is from the remote wireless communication device 420 to the core network 405 via the sidelink 455, relay wireless communication device 425, the cellular link 450, the second base station 415, and the user plane (N3) link 435 via an internet protocol (IP) or L3 routing per a protocol data unit (PDU) session extending from the remote wireless communication device 420 to an N3IWF network device on the core network 405, as discussed further herein.

Third, there is a layer 2 (L2) relay data routing option, in which the routing of data is from the remote wireless communication device 420 to the core network 405 via the sidelink 455, relay wireless communication device 425, the cellular link 450, the second base station 415, and the user plane (N3) link 435 via a layer 2 routing per a protocol data unit (PDU) session extending from the remote wireless communication device 420 to a user plane network device on the core network 405, as discussed further herein.

Additionally, the policy control information may be enhanced to specify a PC5 path type, in which the first wireless communication device 420 communicates with a second wireless communication device 425 via the sidelink 455 (e.g., PC5), not in the context of relaying data to the core network. In such case, the policy control information may include a non-seamless offload indication indicating that the data associated with an application identifier is to be transmitted to the second wireless communication device 425 outside of a PDU session. For example, the non-seamless offload indication in the UE route selection policy (URSP) rules tables 6.6.2.1-1 and 6.6.2.1-2 in 3GPP TS 23.503 v16.4.1 may be modified to identify the PC5 data routing option. Alternatively, the URSP rules tables 6.6.2.1-1 and 6.6.2.1-2 in 3GPP TS 23.503 v16.4.1 may be modified to add a new parameter, such as sidelink (SL) relay non-seamless offload indication identifying the PC5 routing option. The policy control information may also be enhanced to specify an access type identifying the PC5 data routing option. For example, the access type in the URSP rules table 6.6.2.1-3 in 3GPP TS 23.503 v16.4.1 may be modified to add the PC5 routing option to the access type.

Figure 5:
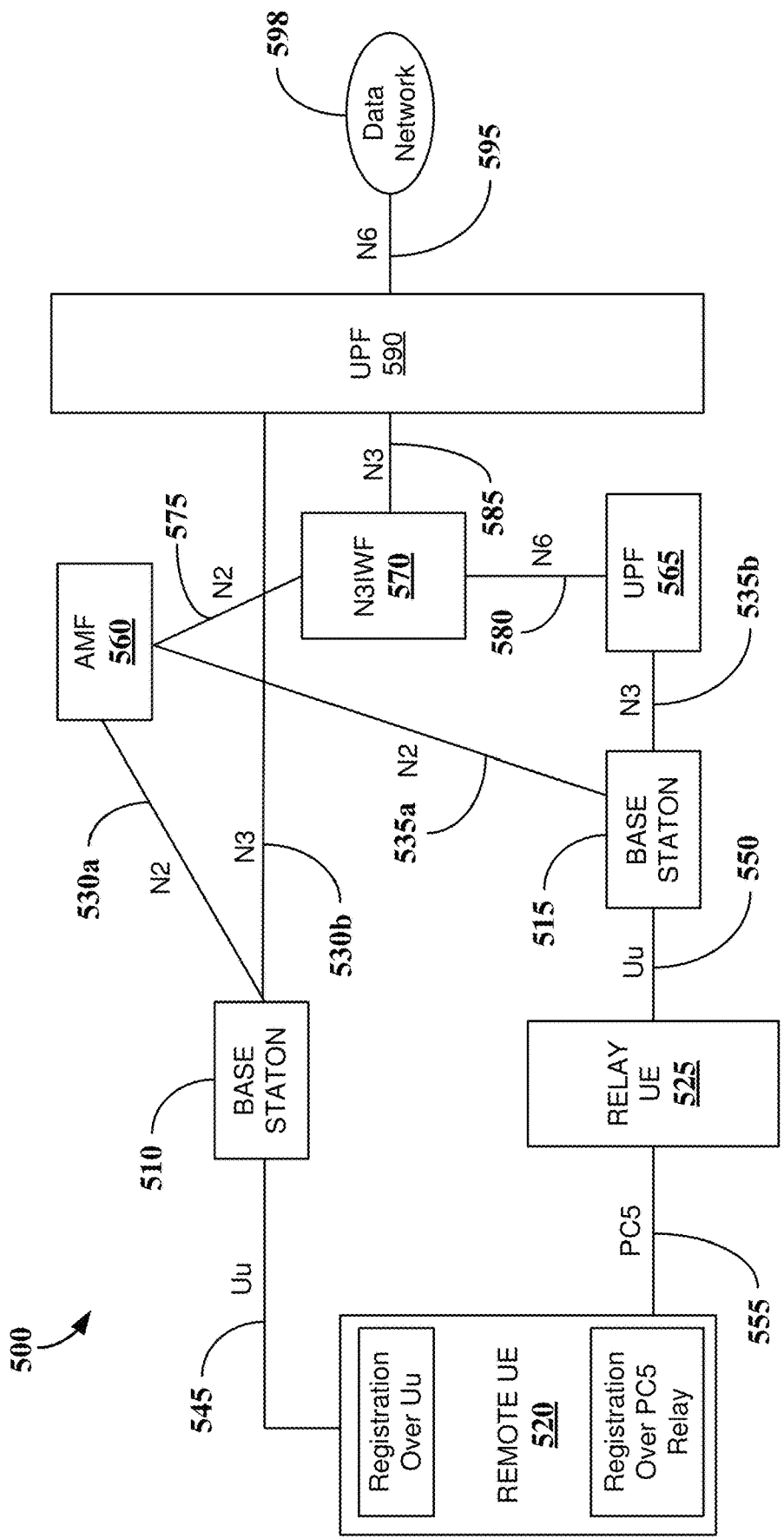
FIG. 5 is a block diagram illustrating another wireless communication system supporting remote wireless communication device to network via at least one relay wireless communication device according to some aspects.

FIG. 5 is a block diagram illustrating another wireless communication system 500 supporting remote wireless communication device-to-network communication via at least one relay wireless communication device according to some aspects. The wireless communication system 500 is an exemplary implementation of the wireless communication system 400 previously discussed. The wireless communication system 500 is referred to in the discussion of the three (3) relay data routing options mentioned above.

The wireless communication system 500 includes a remote wireless communication device 520 (e.g., remote UE), a relay wireless communication device 525 (e.g., relay UE), a first base station 510, a second base station 515, and a core network including an access and mobility management function (AMF) 560, a first user plane function (UPF) network device 565, an N3IWF network device 570, and a second UPF network device 590. The core network is coupled to a backhaul data network 598 via a user plane link 595 (e.g., N6).

Similarly, the remote wireless communication device 520 may be communicatively coupled to the first base station 510 via a cellular link 545 (e.g., Uu). The relay wireless communication device 525 may be communicatively coupled to the second base station 515 via a cellular link 550 (e.g., Uu). The remote and relay wireless communication devices 520 and 525 may be communicatively coupled to each other via a sidelink 555 (e.g., PC5).

The first base station 510 is coupled to the AMF network device 560 via a control plane link 530*a* (e.g., N2). The first base station 510 is also coupled to the second UPF network device 590 via a user plane link 530*b* (e.g., N3). The second base station 515 is coupled to the AMF network device 560 via a control plane link 535*a* (e.g., N2). The second base station 515 is also coupled to the first UPF network device 565 via a user plane link 535*b* (e.g., N3). The first UPF network device 565 is coupled to the N3IWF network device 570 via a user plane link 580 (e.g., N6). The N3IWF network device 570 is coupled to the second UPF network device 590 via the user plane link 585 (e.g., N3). In addition, the second UPF network device 590 is coupled to the backhaul data network 598 via a user plane link 595 (e.g., N6).

The N3IWF network device 570 allows wireless communication devices to communicate with the N3IWF via PDU sessions by way of non-3GPP networks, such as WiFi networks. Prior to the inclusion of the N3IWF network device 570, wireless communication devices communicating with the core network via a non-3GPP network could not do so via a PDU session. Thus, the security, privacy, and other features provided to a PDU session could not be provided to such wireless communication devices. For example, such wireless communication devices depended on the security and privacy features provided by the non-3GPP network through which the data traversed. With the inclusion of the N3IWF network device 570, a PDU session may be established between a wireless communication device and the N3IWF network device 570 even though the data traverses a non-3GPP network.

Figure 6A:
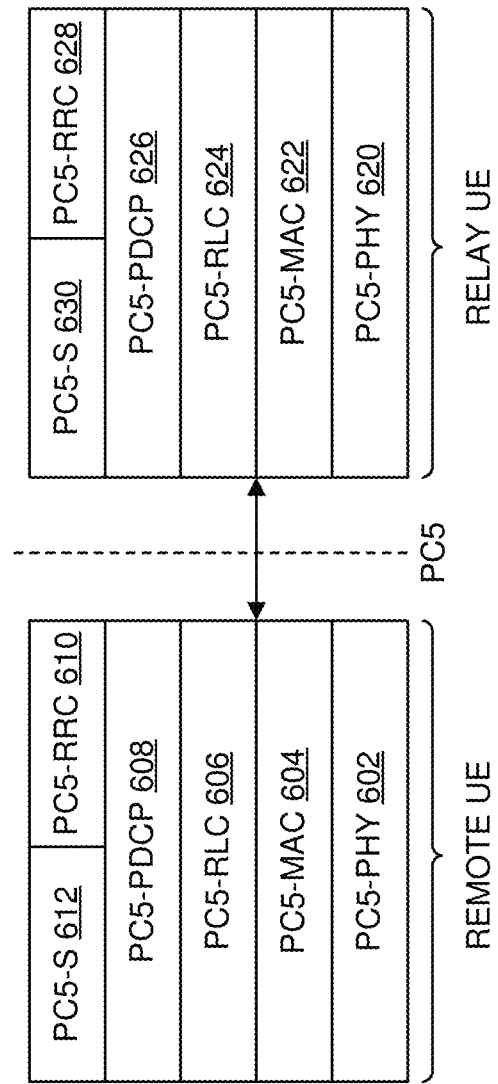
FIGS. 6A-6B are control plane and user plane protocol stack diagrams associated with a layer 3 (L3) relay data routing option according to some aspects.

FIG. 6A is a control plane protocol stack diagram associated with a layer 3 (L3) relay data routing option according to some aspects. The control protocol stack on the left pertains to a remote wireless communication device (e.g., remote UE). The control protocol stack on the right pertains to a relay wireless communication device (e.g., relay UE). The communication interface between the remote and relay communication devices is a sidelink interface (e.g., PC5 interface).

The remote UE includes a control plane protocol stack including a PC5 physical layer (PC5-PHY) 602 forming a Layer 1 (L1) of the protocol stack; a PC5 media access control (PC5-MAC) 604, a PC5 radio link control (PC5-RLC) 606, and a PC5 packet data convergence protocol (PC5-PDCP) 608 forming a Layer 2 (L2) of the protocol stack; and a PC5 radio resource control (PC5-RRC) 610 and PC5 signaling (PC5-S) 612 forming a Layer 3 (L3) of the protocol stack.

Similarly, the relay UE includes a control plane protocol stack including a PC5 physical layer (PC5-PHY) 620 forming a Layer 1 (L1) of the protocol stack; a PC5 media access control (PC5-MAC) 622, a PC5 radio link control (PC5-RLC) 624, and a PC5 packet data convergence protocol (PC5-PDCP) 626 forming a Layer 2 (L2) of the protocol stack; and a PC5 radio resource control (PC5-RRC) 630 and PC5 signaling (PC5-S) 630 forming a Layer 3 (L3) of the protocol stack.

In accordance with the L3 relay data routing option, the remote wireless communication device sets up a sidelink (e.g., PC5 link or unicast link) with the relay wireless communication device. The remote wireless communication device sets up the sidelink by sending sidelink establishing signaling to the relay wireless communication device processed by layers 3, 2, and 1 proximity service (ProSe) protocol stack operations. This involves the remote wireless communication device performing layer 3 protocol stack operations on the signaling, such as PC5-S 612 and PC5-RRC 610 operations; performing layer 2 protocol stack operations on the signaling including PC5-PDCP 608 operations, PC5-RLC 606 operations, and PCT5-MAC 604 operations; and performing layer 1 protocol stack operation on the signaling including PC5-PHY 602 operations.

The relay wireless communication device performs complementary layers 1, 2, and 3 operations on the signaling received from the remote wireless communication device to complete setting up the sidelink with the remote wireless communication device. For example, these include performing layer 1 protocol stack operation including PC5-PHY layer 620 operations on the signaling received from the remote wireless communication device; performing layer 2 protocol stack operations including operations performed by the PC5-MAC layer 622, PC5-RLC layer 624, and PC5-PDCP layer 626 on the signaling received from the PC5-PHY layer; and performing layer 3 protocol stack operations including PC5-S layer 630 and PC5-RRC layer 628 operations on the signaling from the layer 2 operations.

Although not shown in FIG. 6A, the relay wireless communication device establishes a PDU session for relaying data from the remote wireless communication device to the core network via a corresponding base station. Note that in an L3 relay data routing option, the PDU session does not extend to the remote wireless communication device. The relay wireless communication device is merely offloading the data from the remote wireless communication device via the established sidelink for subsequent forwarding or relaying by the relay wireless communication device via the PDU session. In an L3 relay routing operation, the remote wireless communication device may neither include a non-access stratum (NAS) connection to the core network (e.g., the AMF) nor an access stratum (AS) connection to a base station coupled to the core network. Further, in an L3 relay routing operation, the relay wireless communication device reports the presence of the remote wireless communication device to the core network (e.g., the AMF).

Figure 6B:
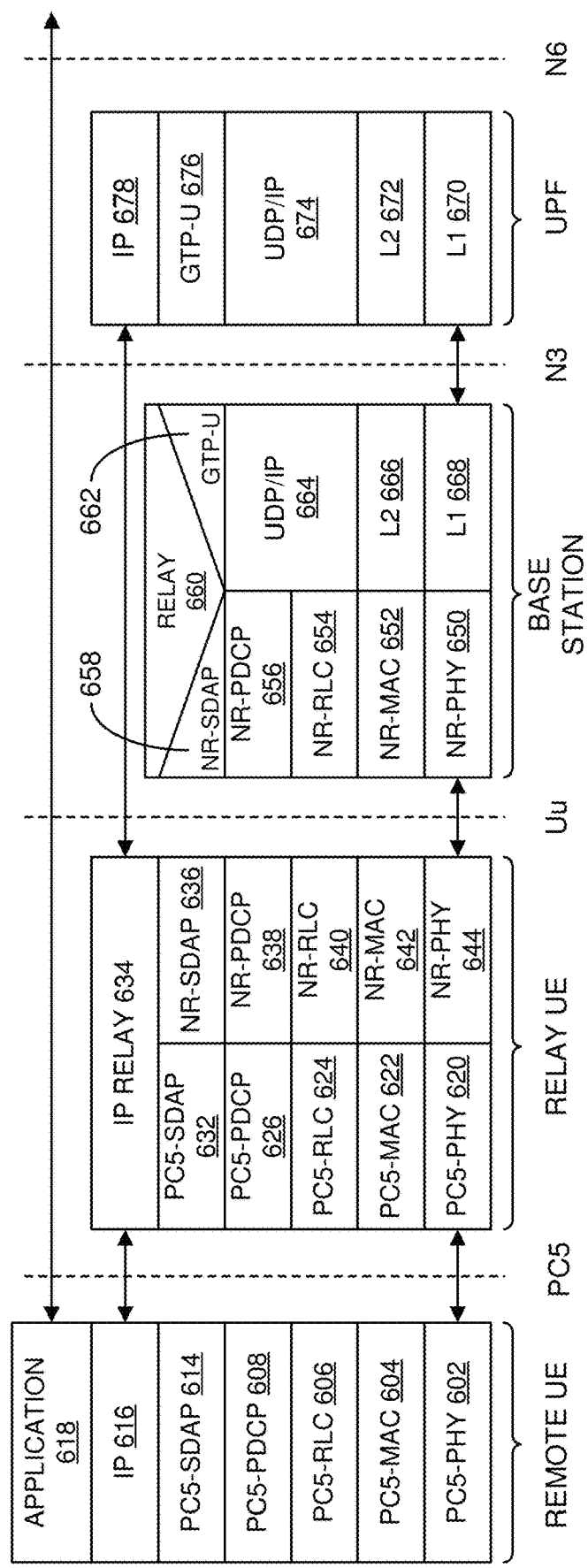

FIG. 6B is a user plane protocol stack diagram associated with a layer 3 (L3) relay data routing option according to some aspects. The left protocol stack pertains to the remote wireless communication device (e.g., remote UE), the second protocol stack from the left pertains to the relay wireless communication device (e.g., relay UE), the third protocol stack from the left pertains to a base station, and the right-most protocol stack pertains to a UPF network device on the core network.

The remote UE includes a user plane protocol stack including the PC5-PHY 602 forming a Layer 1 (L1) of the protocol stack; the PC5-MAC 604, the PC5-RLC 606, the PC5-PDCP 608, and the PC5 service data adaptation protocol (PC5-SDAP) 614 forming a Layer 2 (L2) of the protocol stack; and an internet protocol (IP) 616 forming a Layer 3 (L3) of the protocol stack, and an application layer 618.

The relay UE includes a user plane protocol stack including the PC5-PHY 620 forming a Layer 1 (L1) of the protocol stack; the PC5-MAC 622, the PC5-RLC 624, the PC5-PDCP 626, and a PC5-SDAP 632 forming a Layer 2 (L2) of the protocol stack; and an IP relay 634 forming a Layer 3 (L3) of the protocol stack. The relay UE further includes a New Radio (NR) service data adaptation protocol (NR-SDAP) 636, an NR-PDCP 638, an NR-RLC 640, and an NR-MAC 642 forming a Layer 2 (L2) of the protocol stack, and an NR-PHY 644 forming a Layer 1 (L1) of the protocol stack.

The base station includes a user plane protocol stack including a NR-PHY 650 forming a Layer 1 (L1) of the protocol stack; an NR-MAC 652, an NR-RLC 654, the NR-PDCP 656, and a NR-SDAP 658 forming a Layer 2 (L2) of the protocol stack; and relay layer 660 forming a Layer 3 (L3) of the protocol stack. The base station further includes a general packet radio service (GPRS) tunneling protocol for user plane (GTP-U) 662, a user datagram protocol (UDP)/IP 664, an L2 layer 666, and an L1 layer 668. The UPF includes an L1 layer 670, an L2 layer 672, a UDP/IP 674, a GTP-U 676, and an IP layer 678.

As the name implies, the L3 relay data routing operation routes the data generated by an application from the remote wireless communication device to the core network via an L3 routing, such as an internet protocol (IP) routing. For example, a particular application running on the remote wireless communication device generates data to be routed to the core network, and possibly, further down to the external data network. An IP protocol stack operation generates an IP packet including the data. The remote wireless communication device may have received an IP address identifying the remote wireless communication device as the originator of the IP packet. The IP packet is then processed by the PC5 protocol stack of the remote wireless communication device, such as a service data application protocol (PC5-SDAP) layer 614, packet data convergence protocol (PC5-PDCP) layer 608, PC5-RLC layer 606, PC5-MAC layer 604, and PC5-PHY layer 602.

The relay wireless communication device performs the complementary PC5 protocol stack operations on the IP packet received from the remote wireless communication device via the sidelink (e.g., PC5). These include PC5-PHY layer 620, PC5-MAC layer 622, PC5-RLC layer 624, PC5-PDCP layer 626, and the PC5-SDAP layer 632 operations. An IP relay processing component sends the IP packet through an NR protocol processing stack, such as NR-SDAP 636, NR-PDCP 638, NR-RLC 640, NR-MAC 642, and NR-PHY 644 layers, for transmission to the base station via a Uu link.

The base station performs the complementary NR protocol stack operations on the IP packet received from the relay wireless communication device via the cellular link (e.g., Uu). These include NR-PHY 650, NR-MAC 652, NR-RLC 654, NR-PDCP 656, and NR-SDAP 658 layer operations. An IP relay processing component sends the IP packet to the core network user plane protocol processing stack, using, for example, the GTP-U 662, UDP/IP 664, L2 666, and L1 668 layer operations.

The UPF network device performs the complementary core network user plane protocol operations on the IP packet received from the base station via the N3 user plane link, including L1 670, L2 672, UDP/IP 674, GTP-U 676, and IP 678 layer operations. The UPF network device may then send the IP packet to the external data network via an N6 user plane link. As previously discussed, the transmission of the IP packet from the relay wireless communication device to the core network may be pursuant to a PDU session. In this example, the PDU session does not extend to the remote wireless communication device as the relay wireless communication device is merely offloading the data to/from the remote wireless communication device for L3 relaying purposes, which occurs outside of the PDU session.

Figure 7A:
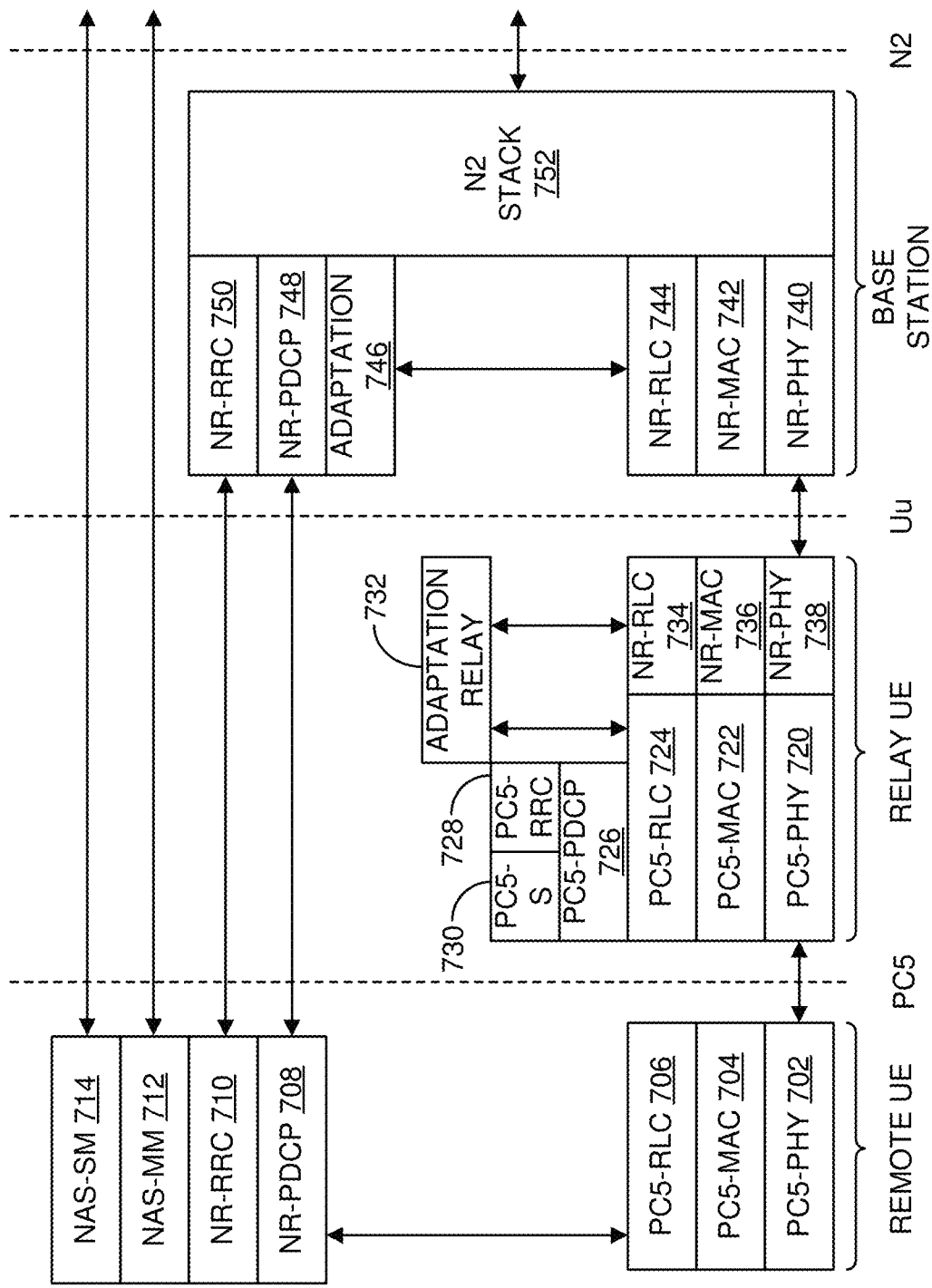
FIGS. 7A-7B are control plane and user plane protocol stack diagrams associated with a layer 3 (L3) relay with non-3$^{rd}$ Generation Partnership Project (3GPP) Interworking Function (N3IWF) data routing option according to some aspects.

FIG. 7A is a control plane protocol stack diagram associate with a layer 3 (L3) relay with N3IWF data routing option according to some aspects. In the L3 relay with N3IWF data routing option, the remote wireless communication device is visible to the core network, as if it were behind a non-3GPP network. Thus, in this case, the remote wireless communication device has a NAS connection to the core network (e.g., AMF) via the relay wireless communication device, and an AS connection to a base station via the relay wireless communication device. Accordingly, the remote wireless communication device may setup an IP PDU session with a N3IWF network device on the core network.

The control protocol stack on the left pertains to a remote wireless communication device (e.g., remote UE). The control protocol stack in the middle pertains to a relay wireless communication device (e.g., relay UE). The control protocol stack on the right pertains to a base station. The communication interface between the remote and relay wireless communication devices is a sidelink interface (e.g., PC5 interface). The communication interface between the relay wireless communication device and the base station is a cellular interface (e.g., Uu interface).

The remote UE includes a control plane protocol stack including a PC5-PHY 702 forming a Layer 1 (L1) of the protocol stack; a PC5-MAC 704, a PC5-RLC 706, a PC5-PDCP 708 forming a Layer 2 (L2) of the protocol stack; and an NR-RRC 710, NAS mobility management (NAS-MM) 712, and NAS session management (NAS-SM) 714 forming a Layer 3 (L3) of the protocol stack.

The relay UE includes a control plane protocol stack including a PC5-PHY 720 forming a Layer 1 (L1) of the protocol stack; a PC5-MAC 722, a PC5-RLC 724, a PC5-PDCP 726 forming a Layer 2 (L2) of the protocol stack; and a PC5-RRC 728, PC5-S 730, and an adaptation relay 732 forming a Layer 3 (L3) of the protocol stack. The relay UE further includes an NR-RLC 734, and an NR-MAC 736 forming a Layer 2 (L2) of the protocol stack, and an NR-PHY 738 forming a Layer 1 (L1) of the protocol stack.

The base station includes a control plane protocol stack including a NR-PHY 740 forming a Layer 1 (L1) of the protocol stack; an NR-MAC 742, an NR-RLC 744, an adaptation layer 746, and an NR-PDCP 748 forming a Layer 2 (L2) of the protocol stack; and an NR-RRC 750 forming a Layer 3 (L3) of the protocol stack. The base station further includes an N2 protocol stack 752.

In accordance with the L3 relay with N3IWF data routing option, the remote wireless communication device sets up an IP PDU session with the N3IWF network device by performing NAS protocol stack processing operations on signaling, such as NAS-SM 714 operations, and NAS-MM 712 operations; performing NR protocol processing operations on the signaling, such as NR-RRC 710 and NR-PDCP 708 operations; and performing PC5 protocol processing operations, such as PC5-RLC 706, PC5-MAC 704, and PC5-PHY 702 operations.

The relay wireless communication device, in turn, performs complementary PC5 protocol stack processing operations on the signaling received from the remote wireless communication device via the sidelink (e.g., PC5). The operations include PC5-PHY 720, PC5-MAC 722, and PC5-RLC 724 operations. The signaling is then provided to an adaptation relay layer 732 for the relay wireless communication device to enhance the PC5 session to multiplex other data from one or more other remote wireless communication devices for transmission to the core network. The signaling is then processed via lower NR protocol layer stacks, such as NR-RLC 734, NR-MAC 736, and NR-PHY 738.

The base station, in turn, performs complementary NR protocol stack processing operations on the signaling received from the relay wireless communication device via the cellular link (e.g., Uu). The operations include NR-PHY 740, NR-MAC 742, and NR-RLC 744. The signaling is then provided to an adaptation relay layer 746 for the base station to demultiplex the data from all of the one or more remote wireless communication devices for transmission to the core network. The signaling is then processed via upper NR protocol layer stacks, such as NR-PDCP 748 and NR-RRC 750 layers. The base station then processes the signaling via an N2 control plane protocol stack 752, and provides the signaling to the AMF via the control plane link N2. The AMF then sets up the IP PDU session between the remote wireless communication device and the N3IWF network device.

Figure 7B:
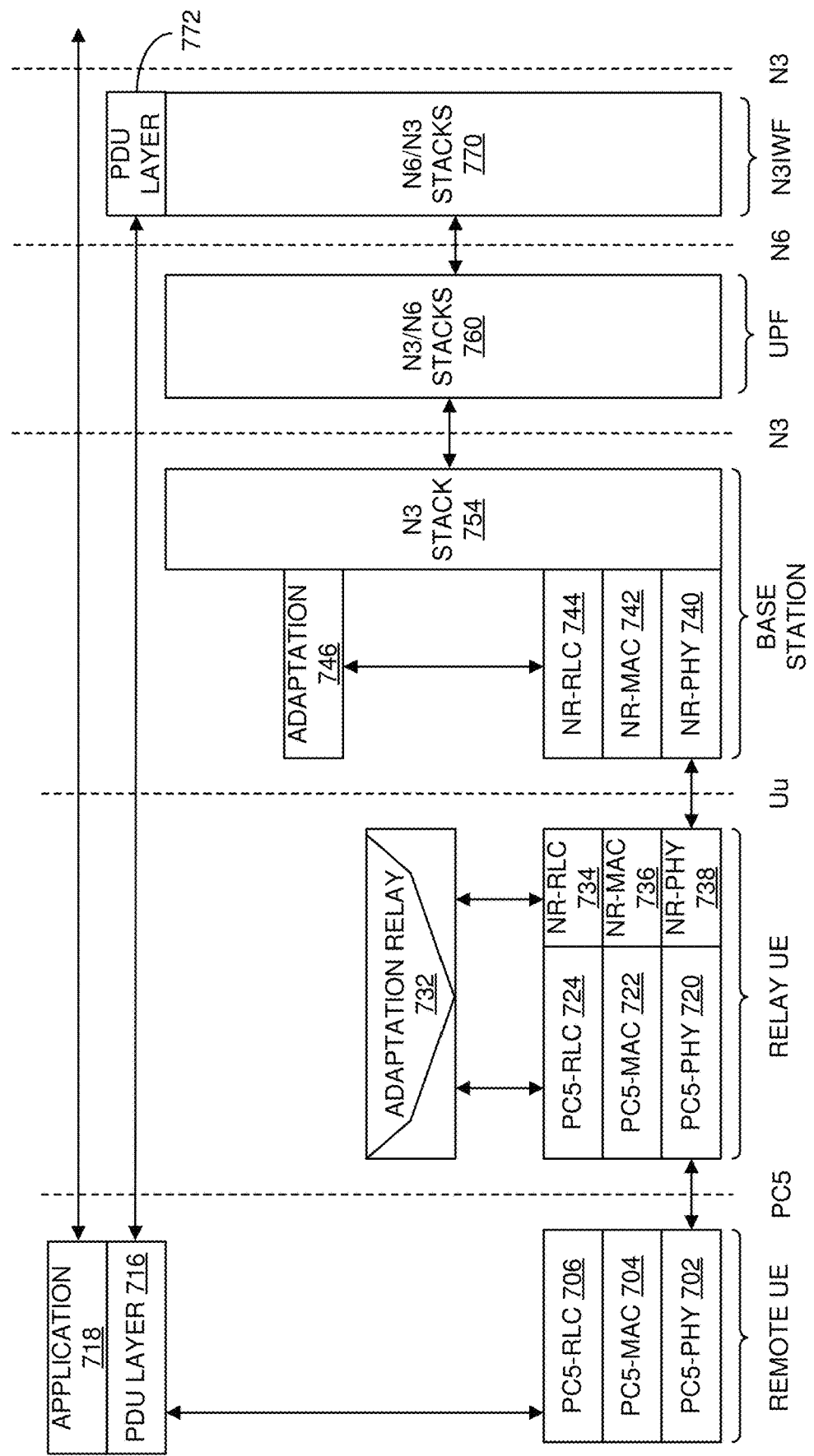

FIG. 7B is a user plane protocol stack diagram associated with a layer 3 (L3) relay with N3IWF data routing option according to some aspects. As previously discussed, the IP PDU session extends from the remote wireless communication device to the N3IWF network device. The left protocol stack pertains to the remote wireless communication device (e.g., remote UE), the second protocol stack from the left pertains to the relay wireless communication device (e.g., relay UE), the third protocol stack from the left pertains to a base station, the fourth protocol stack from the left pertains to a UPF network device, and the right-most protocol stack pertains to the N3IWF network device on the core network.

The remote UE includes a user plane protocol stack including the PC5-PHY 702 forming a Layer 1 (L1) of the protocol stack; the PC5-MAC 704, and the PC5-RLC 706 forming a Layer 2 (L2) of the protocol stack; and a PDU layer 716 and application layer 718 forming a Layer 3 (L3) of the protocol stack.

The relay UE includes a user plane protocol stack including the PC5-PHY 720 forming a Layer 1 (L1) of the protocol stack; a PC5-MAC 722, a PC5-RLC 724, and an adaptation relay 732 forming a Layer 2 (L2) of the protocol stack. The user plane protocol stack further includes a NR-RLC 734 and NR-MAC 736 forming a Layer 2 (L2) protocol stack, and a NR-PHY 738 forming a Layer 1 (L1) of the protocol stack.

The base station includes a user plane protocol stack including a NR-PHY 740 forming a Layer 1 (L1) of the protocol stack; and an NR-MAC 742, an NR-RLC 744, and an adaptation layer 746 forming a Layer 2 (L2) of the protocol stack. The base station further includes an N3 protocol stack 754. The UPF includes N3/N6 protocol stacks 760. The N3IWF includes N6/N3 protocol stacks 770 and a PDU layer 772.

As the name implies, the L3 relay with N3IWF data routing operation routes the data generated by an application from the remote wireless communication device to the N3IWF network device via an L3 (IP) routing per a PDU session. For example, a particular application 718 running on the remote wireless communication device generates data to be routed to the N3IWF network device, and thereafter, further down to the external data network. A PDU layer 716 operation generates an IP packet including the data. The remote wireless communication device has an IP address as it has a NAS context with the core network. The IP packet is then processed by the PC5 protocol stack of the remote wireless communication device, such as the PC5-RLC 706, PC5-MAC 704, and PC5-PHY 702 layers.

The relay wireless communication device performs the complementary PC5 protocol stack operations on the IP packet received from the remote wireless communication device via the sidelink (e.g., PC5). These include PC5-PHY 720, PC5-MAC 722, and PC5-RLC 724 operations. The adaptation relay layer 732 may multiplex the data from the remote wireless communication device with data from one or more other remote wireless communication devices. The adaptation relay layer 732 sends the IP packet through an NR protocol processing stack, such as NR-RLC 734, NR-MAC 736, and NR-PHY 738 layers, for transmission to the base station via a Uu link.

The base station performs the complementary NR protocol stack operations on the IP packet received from the relay wireless communication device via the cellular link (e.g., Uu). These include NR-PHY 740, NR-MAC 742, and NR-RLC 744. The adaptation layer 746 at the base station demultiplexes the data from the remote wireless communication devices, which the relay wireless communication devices multiplexed. The base station processes the IP packet via an N3 user plane protocol stack 754.

The UPF network device performs the complementary N3 user plane protocol stack operations on the IP packet received from the base station via the N3 user plane link, and performs N6 user plane protocol stack operations via N3/N6 user plane protocol stacks. The N3IWF network device then performs the complementary N6 user plane protocol stack operations on the IP packet received from the UPF network device via the N6 user plane link, and performs an N3 user plane protocol stack operations via the N3/N6 user plane protocol stacks. The N3IWF network may then send the IP packet to the external data network via another N3 interface, UPF network device, and another N6 interface.

Figure 8A:
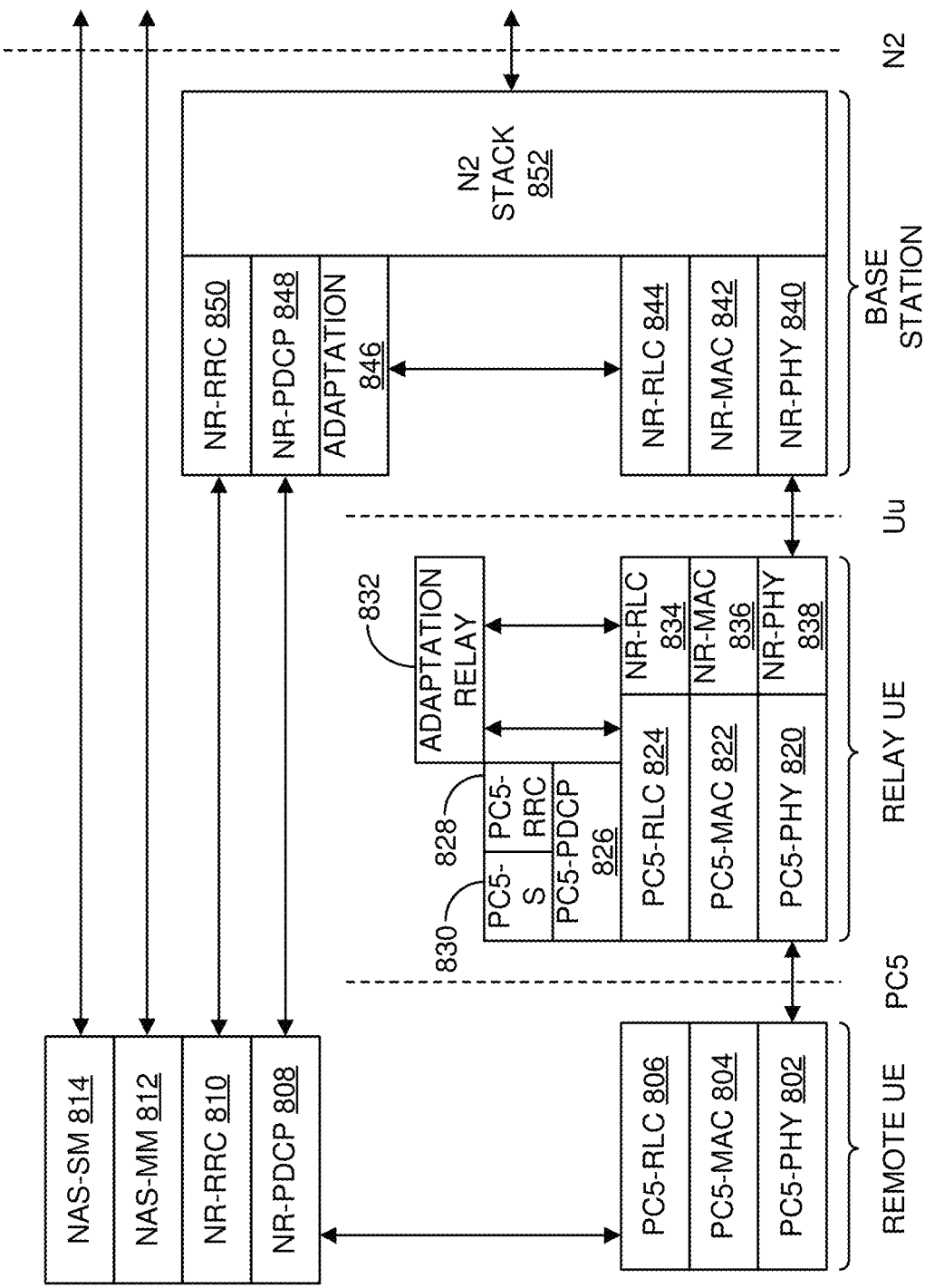
FIGS. 8A-8B are control plane and user plane protocol stack diagrams associated with a layer 2 (L2) relay data routing option according to some aspects.

FIG. 8A is a control plane protocol stack diagram associated with a layer 2 (L2) relay data routing option according to some aspects. In the L2 relay data routing option, the remote wireless communication device is visible to the core network. Thus, in this case, the remote wireless communication device has a NAS connection to the core network (e.g., AMF) via the relay wireless communication device, and an AS connection to a base station via the relay wireless communication device. Accordingly, the remote wireless communication device may setup a PDU session with the core network.

The control protocol stack on the left pertains to a remote wireless communication device (e.g., remote UE). The control protocol stack in the middle pertains to a relay wireless communication device (e.g., relay UE). The control protocol stack on the right pertains to a base station. The communication interface between the remote and relay wireless communication devices is a sidelink interface (e.g., PC5 interface). The communication interface between the relay wireless communication device and the base station is a cellular interface (e.g., Uu interface).

The remote UE includes a control plane protocol stack including a PC5-PHY 802 forming a Layer 1 (L1) of the protocol stack; a PC5-MAC 804, a PC5-RLC 806, a PC5-PDCP 808 forming a Layer 2 (L2) of the protocol stack; and an NR-RRC 810, NAS-MM 812, and NAS-SM 814 forming a Layer 3 (L3) of the protocol stack.

The relay UE includes a control plane protocol stack including a PC5-PHY 820 forming a Layer 1 (L1) of the protocol stack; a PC5-MAC 822, a PC5-RLC 824, a PC5-PDCP 826 forming a Layer 2 (L2) of the protocol stack; and a PC5-RRC 828, PC5-S 830, and an adaptation relay 832 forming a Layer 3 (L3) of the protocol stack. The relay UE further includes an NR-RLC 834, and an NR-MAC 836 forming a Layer 2 (L2) of the protocol stack, and an NR-PHY 838 forming a Layer 1 (L1) of the protocol stack.

The base station includes a control plane protocol stack including a NR-PHY 840 forming a Layer 1 (L1) of the protocol stack; an NR-MAC 842, an NR-RLC 844, an adaptation layer 846, and an NR-PDCP 848 forming a Layer 2 (L2) of the protocol stack; and an NR-RRC 850 forming a Layer 3 (L3) of the protocol stack. The base station further includes an N2 protocol stack 852.

In accordance with the L2 relay data routing option, the remote wireless communication device sets up a PDU session with the core network by performing NAS protocol stack processing operations on signaling, such as NAS-SM 814 and NAS-MM 812 operations; performing NR protocol processing operations on the signaling, such as NR-RRC 810 and NR-PDCP 808 operations; and performing PC5 protocol processing operations, such as PC5-RLC 806, PC5-MAC 804, and PC5-PHY 802 operations.

The relay wireless communication device, in turn, performs complementary PC5 protocol stack processing operations on the signaling received from the remote wireless communication device via the sidelink (e.g., PC5). The operations include PC5-PHY 820, PC5-MAC 822, and PC5-RLC 824. The signaling is then provided to an adaptation relay layer for the relay wireless communication device to enhance the PC5 session to multiplex other data from one or more other remote wireless communication devices for transmission to the core network. The signaling is then processed by lower NR protocol layer stacks, such as NR-RLC 834, NR-MAC 836, and NR-PHY 838 layers, for transmission to the base station via a Uu link.

The base station, in turn, performs complementary NR protocol stack processing operations on the signaling received from the relay wireless communication device via the cellular link (e.g., Uu). These operations include NR-PHY 840, NR-MAC 842, and NR-RLC 844. The signaling is then provided to the adaptation relay layer 846 for the base station to demultiplex the data from all of the one or more remote wireless communication devices for transmission to the core network. The signaling is then processed via upper NR protocol layer stacks, such as NR-PDCP 848 and NR-RRC 850. The base station then processes the signaling via an N2 control plane protocol stack 852, and provides the signaling to the AMF via the control plane link N2. The AMF then sets up the PDU user plane session between the remote wireless communication device and the core network.

Figure 8B:
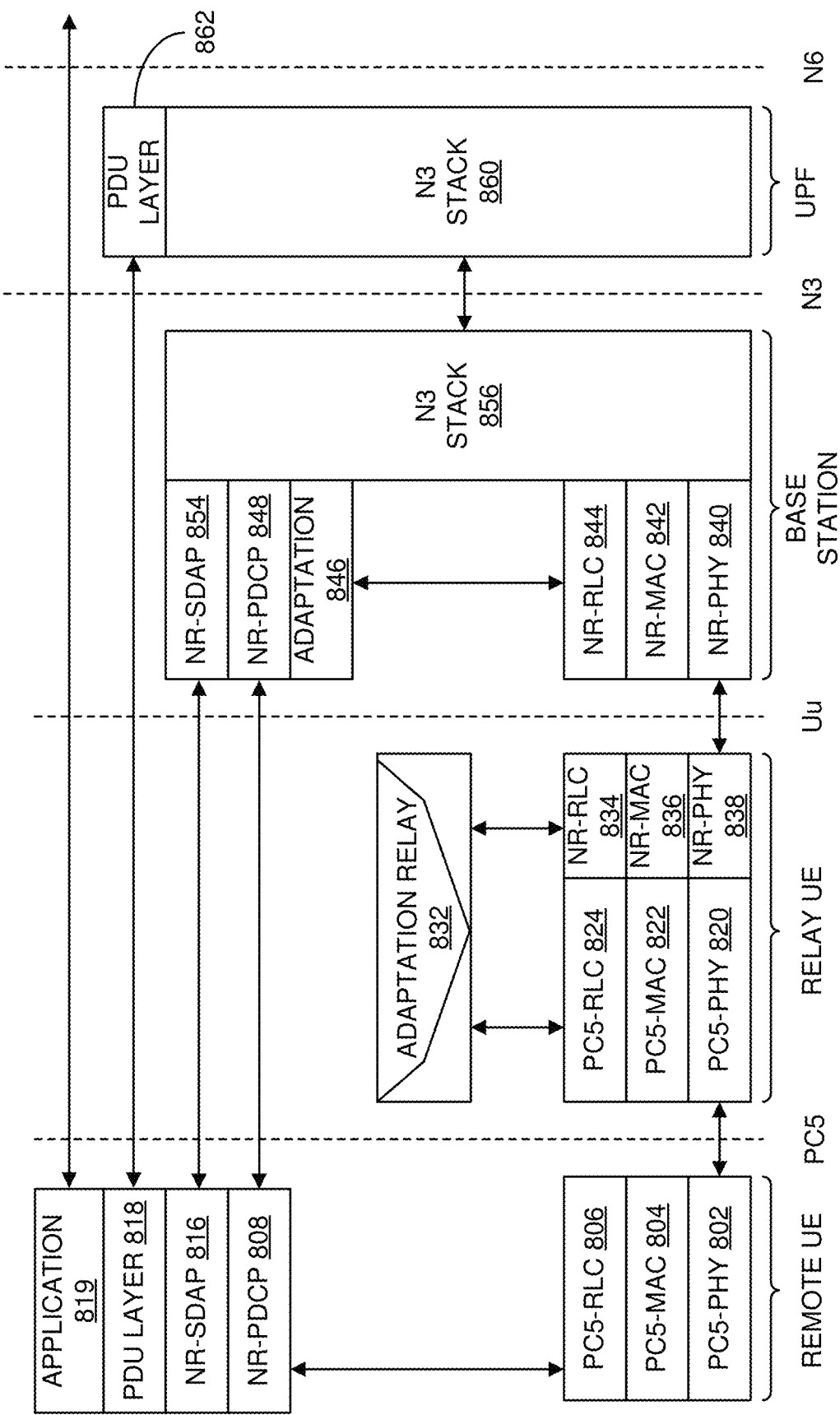

FIG. 8B is a user plane protocol stack diagram associated with a layer 2 (L2) relay data routing option according to some aspects. As previously discussed, the PDU session extends from the remote wireless communication device to the core network. The left protocol stack pertains to the remote wireless communication device (e.g., remote UE), the second protocol stack from the left pertains to the relay wireless communication device (e.g., relay UE), the third protocol stack from the left pertains to a base station, and the right-most protocol stack pertains to a UPF network device.

The remote UE includes a user plane protocol stack including the PC5-PHY 802 forming a Layer 1 (L1) of the protocol stack; the PC5-MAC 804, the PC5-RLC 806, NR-PDCP 808, and NR-SDAP 816 forming a Layer 2 (L2) of the protocol stack; and a PDU layer 818 and application layer 819 forming a Layer 3 (L3) of the protocol stack.

The relay UE includes a user plane protocol stack including the PC5-PHY 820 forming a Layer 1 (L1) of the protocol stack; a PC5-MAC 822, a PC5-RLC 824, and an adaptation relay 832 forming a Layer 2 (L2) of the protocol stack. The user plane protocol stack further includes an NR-RLC 834 and NR-MAC 836 forming a Layer 2 (L2) protocol stack, and a NR-PHY 838 forming a Layer 1 (L1) of the protocol stack.

The base station includes a user plane protocol stack including a NR-PHY 840 forming a Layer 1 (L1) of the protocol stack; and an NR-MAC 842, an NR-RLC 844, an adaptation layer 846, an NR-PDCP 848, and an NR-SDAP 854 forming a Layer 2 (L2) of the protocol stack. The base station further includes an N3 protocol stack 856. The UPF includes an N3 protocol layer 860.

As the name implies, the L2 relay data routing operation routes the data generated by an application from the remote wireless communication device to the core network device via an L2 routing pursuant to a PDU session. For example, a particular application 819 running on the remote wireless communication device generates data to be routed to the core network, and thereafter, further down to the external data network. A PDU session layer 818 generates a PDU packet including the data. The PDU packet is then processed by the NR-SDAP 816 and NR PDCP 808 layers, and PC5 protocol stack of the remote wireless communication device, such as the PC5-RLC 806, PC5-MAC 804, and PC5-PHY 802 layers.

The relay wireless communication device performs the complementary PC5 protocol stack operations on the PDU packet received from the remote wireless communication device via the sidelink (e.g., PC5). These include PC5-PHY 820, PC5-MAC 822, and PC5-RLC 824 operations. The adaptation relay layer 832 may multiplex the data from the remote wireless communication device with data from one or more other remote wireless communication devices. The adaptation relay layer 832 sends the PDU packet through an NR protocol processing stack, such as NR-RLC 834, NR-MAC 836, and NR-PHY 838 layers, for transmission to the base station via a Uu link.

The base station performs the complementary lower layer NR protocol stack operations on the PDU packet received from the relay wireless communication device via the cellular link (e.g., Uu). These include NR-PHY 840, NR-MAC 842, and NR-RLC 844 operations. The adaptation layer 846 demultiplexes the data from the remote wireless communication devices, which the relay wireless communication devices may have multiplexed. The base station processes the PDU packet via upper NR protocol layers, such as NR-SDAP 854 and NR-PDCP 848, and then performs N3 user plane protocol stack processing via the N3 user plane protocol stack 856.

The UPF network device performs the complementary N3 user plane protocol stack layer 860 operations on the PDU packet received from the base station via the N3 user plane link, and performs an N6 user plane protocol stack operations. The UPF network device may then send the data via an IP packet to the external data network via N6 interface.

Figure 9:
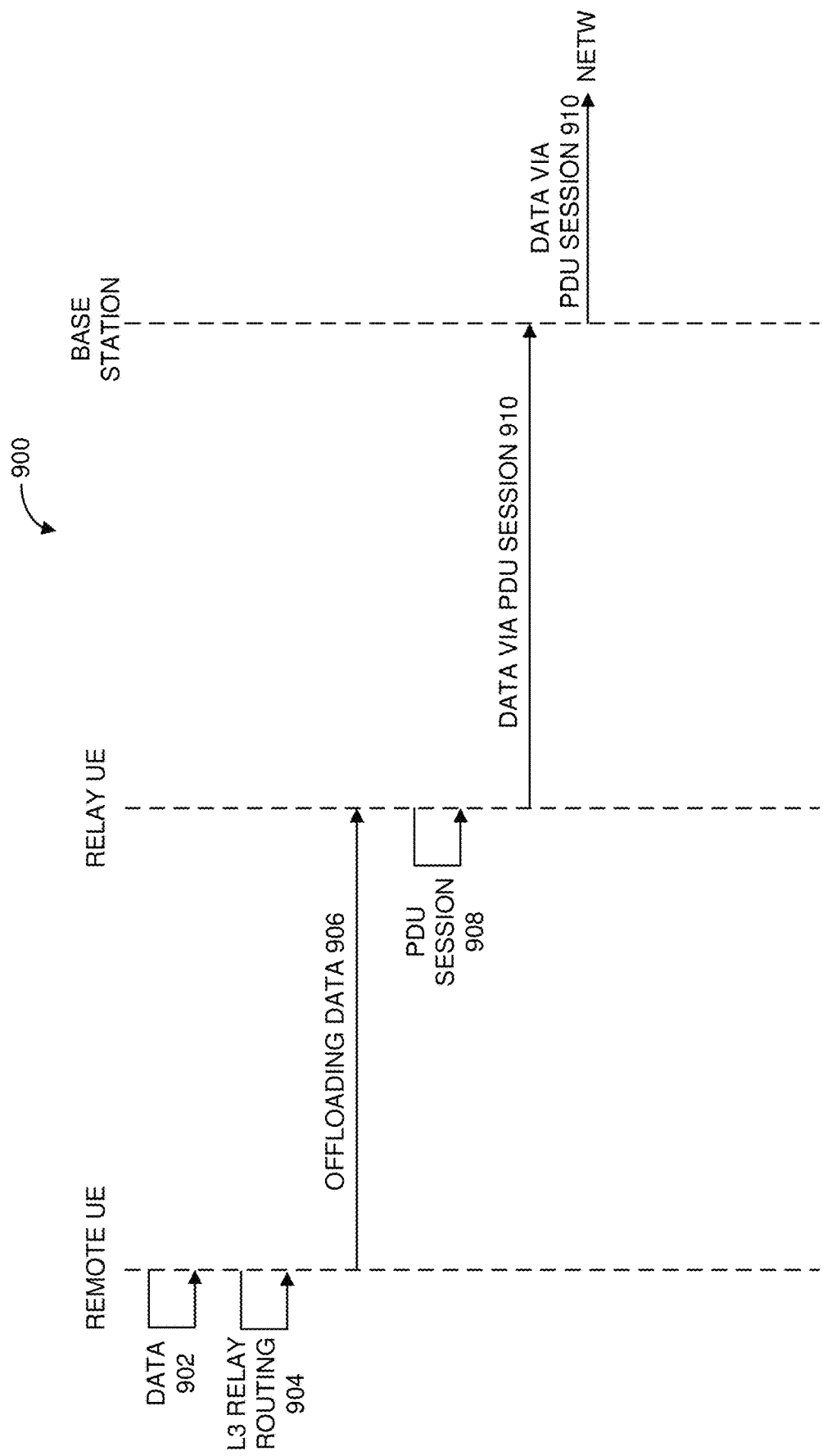
FIG. 9 is a flow chart of an exemplary signaling diagram of routing data transmission from a remote wireless communication device to a network using the L3 relay data routing option according to some aspects.

FIG. 9 is a flow chart of an exemplary signaling diagram 900 of routing data from a remote wireless communication device to a network using the L3 relay data routing option according to some aspects. According to the diagram 900, a remote wireless communication device (e.g., remote UE) generates data for transmission to a network based on an application at 902.

Then, the remote wireless communication device selects an L3 relay data routing option from among a set of data routing options (e.g., L3 relay, L3 relay with N3IWF, and L2 relay options) for routing the data to the network based on policy control information at 904. For example, the policy control information may include an application identifier (ID) that identifies the application generating the data per operation 902. The policy control information may further include a list of route selection descriptors identifying a list of data routing options to be used by the remote wireless communication device to send the data to the network. In this example, the list of route selection descriptions identified the L3 relay data routing option, but could also have identified the L3 relay with N3IWF and L2 relay data routing options. As an example, URSP rules tables 6.6.2.1-1 and 6.6.2.1-2 in 3GPP TS 23.503 v16.4.1 may be modified to include the L3 relay, L3 relay with N3IWF, and L2 relay data routing options as available data routing options for the application identified by the corresponding application identifier in the table.

As the L3 relay data routing option does not have a PDU session extending to the remote wireless communication device, the policy control information may include a non-seamless offload indication indicating that the data associated with the application identifier is to be transmitted to the relay wireless communication device outside of a PDU session. For example, the non-seamless offload indication in the URSP rules tables 6.6.2.1-1 and 6.6.2.1-2 in 3GPP TS 23.503 v16.4.1 may be modified to identify the PC5 L3 relay data routing option as well as a PC5 routing option (UE-to-UE without relay). Alternatively, the URSP rules tables 6.6.2.1-1 and 6.6.2.1-2 in 3GPP TS 23.503 v16.4.1 may be modified to add a new parameter, such as sidelink (SL) relay non-seamless offload indication identifying the PC5 L3 relay data routing option as well as the PC5 routing option.

Then, the remote wireless communication device transmits or offloads the data to the relay wireless communication device (e.g., relay UE) via a sidelink for routing the data to the network in accordance with the L3 relay data routing option at 906. Further, the relay wireless communication device establishes a PDU session with the network via a base station for relaying the data from the remote wireless communication device to the network in accordance with the L3 relay data routing option based on the policy control information at 908. The policy control information may specify a session and service continuity (SSC) mode 1 in order to preserve an IP address identifying the relay wireless communication device per the PDU session. The policy control information may also specify a network slice selection (NSS) identifying one or more network slices over which the PDU session is taking place. Additionally, the policy control information may specify a data network name (DNN) for the PDU session. As an example, these policy control information may be included in the URSP rules tables 6.6.2.1-1 and 6.6.2.1-2 in 3GPP TS 23.503 v16.4.1.

Then, the relay wireless communication device receives the data from the remote wireless communication device, and transmits the data to the base station per the PDU session at 910. At 912, the base station receives the data from the relay wireless communication device, and transmits the data to the network (e.g., UPF network device) per the PDU session.

Figure 10:
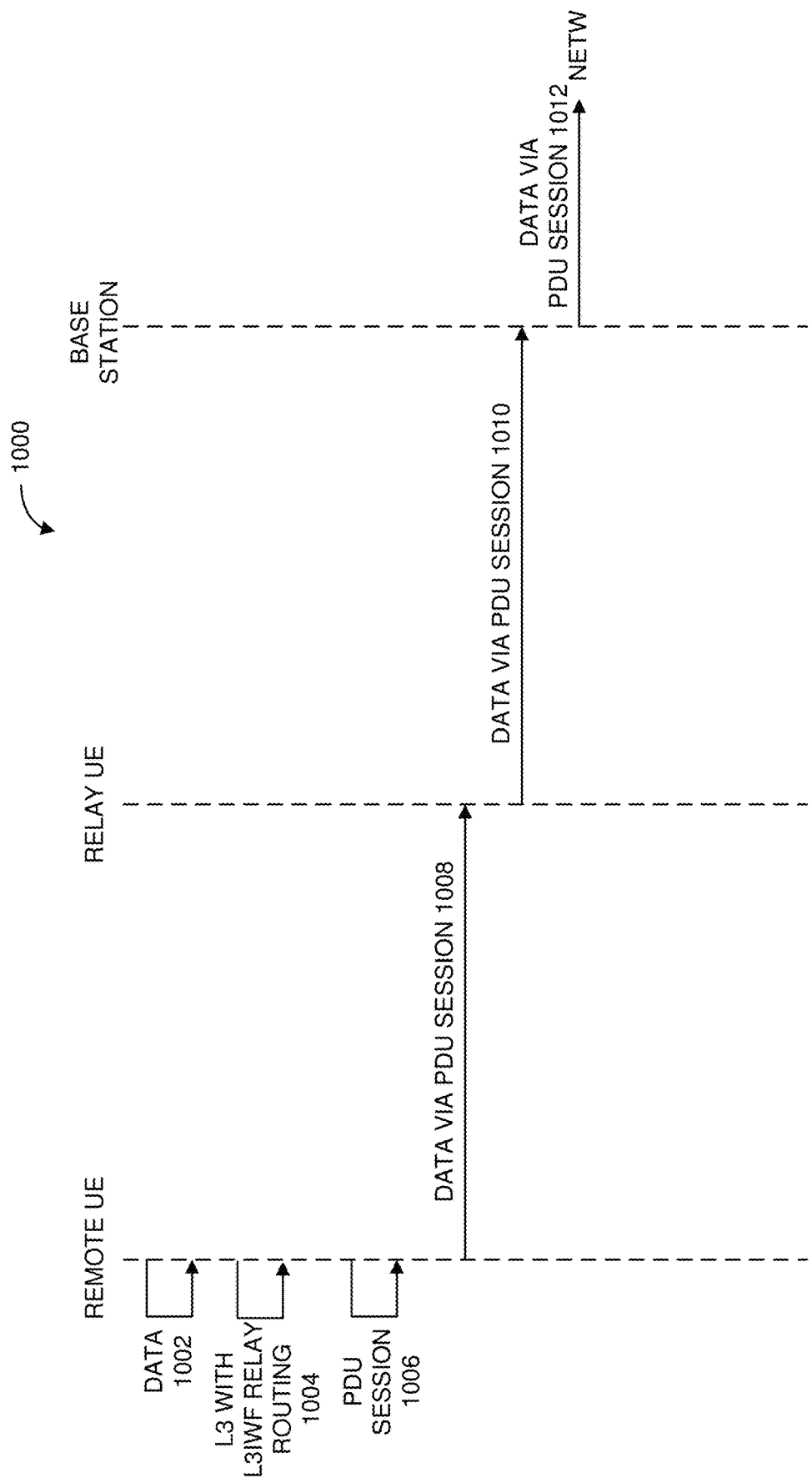
FIG. 10 is a flow chart of an exemplary signaling diagram of routing data transmission from a remote wireless communication device to a network using the L3 relay with N3IWF data routing option according to some aspects.

FIG. 10 is a flow chart of an exemplary signaling diagram 1000 of routing data from a remote wireless communication device to a network using the L3 relay with N3IWF data routing option according to some aspects. According to the diagram 1000, a remote wireless communication device (e.g., remote UE) generates data for transmission to a network based on an application at 1002.

Then, the remote wireless communication device selects an L3 relay with N3IWF data routing option from among a set of data routing options (e.g., L3 relay, L3 relay with N3IWF, and L2 relay options) for routing the data to the network based on policy control information at 1004. For example, the policy control information may include an application identifier (ID) that identifies the application generating the data per operation 1002. The policy control information may further include a list of route selection descriptors identifying a list of data routing options to be used by the remote wireless communication device to send the data to the network. In this example, the list of route selection descriptions identified the L3 relay with N3IWF data routing option, but could also have identified the L3 and L2 relay data routing options. As an example, URSP rules tables 6.6.2.1-1 and 6.6.2.1-2 in 3GPP TS 23.503 v16.4.1 may be modified to include the L3 relay, L3 relay with N3IWF, and L2 relay data routing options as available data routing options for the application identified by the corresponding application identifier in the table.

As the L3 relay with N3IWF data routing option has a PDU session extending from the remote wireless communication device to the network via the relay wireless communication device and base station, the policy control information may specify a session and service continuity (SSC) mode 1 in order to preserve an IP address identifying the remote wireless communication device per the PDU session. The policy control information may also specify a network slice selection (NSS) identifying one or more network slices over which the PDU session is taking place. Additionally, the policy control information may specify a data network name (DNN) for the PDU session. The policy control information may specify an access type preference identifying the PC5 layer 3 with N3IWF data routing option. The policy control information may further specify service criteria for the PDU session, such security, privacy, quality of service (QoS), and network loading criteria. The policy control information may further specify validation criteria such as a time window in which the L3 relay with N3IWF data routing option is available, and/or location where the remote wireless communication device needs to be present for the L3 relay with N3IWF data routing option to be available. As an example, these policy control information may be included in the URSP rules tables 6.6.2.1-1, 6.6.2.1-2, and/or 6.6.2.1-3 from TS 23.503.

Then, the remote wireless communication device establishes a PDU session with a N3IWF network device coupled to the network via the relay wireless communication device and the base station at 1006. Then, the remote wireless communication device transmits the data to the relay wireless communication device (e.g., relay UE) via a sidelink for routing the data to the network in accordance with the L3 relay with N3IWF data routing option at 1008. Further, the relay wireless communication device receives the data from the remote wireless communication device, and transmits the data to the base station per the PDU session at 1010. Then, the base station receives the data from the relay wireless communication device, and transmits the data to the N3IWF network device per the PDU session at 1012.

Figure 11:
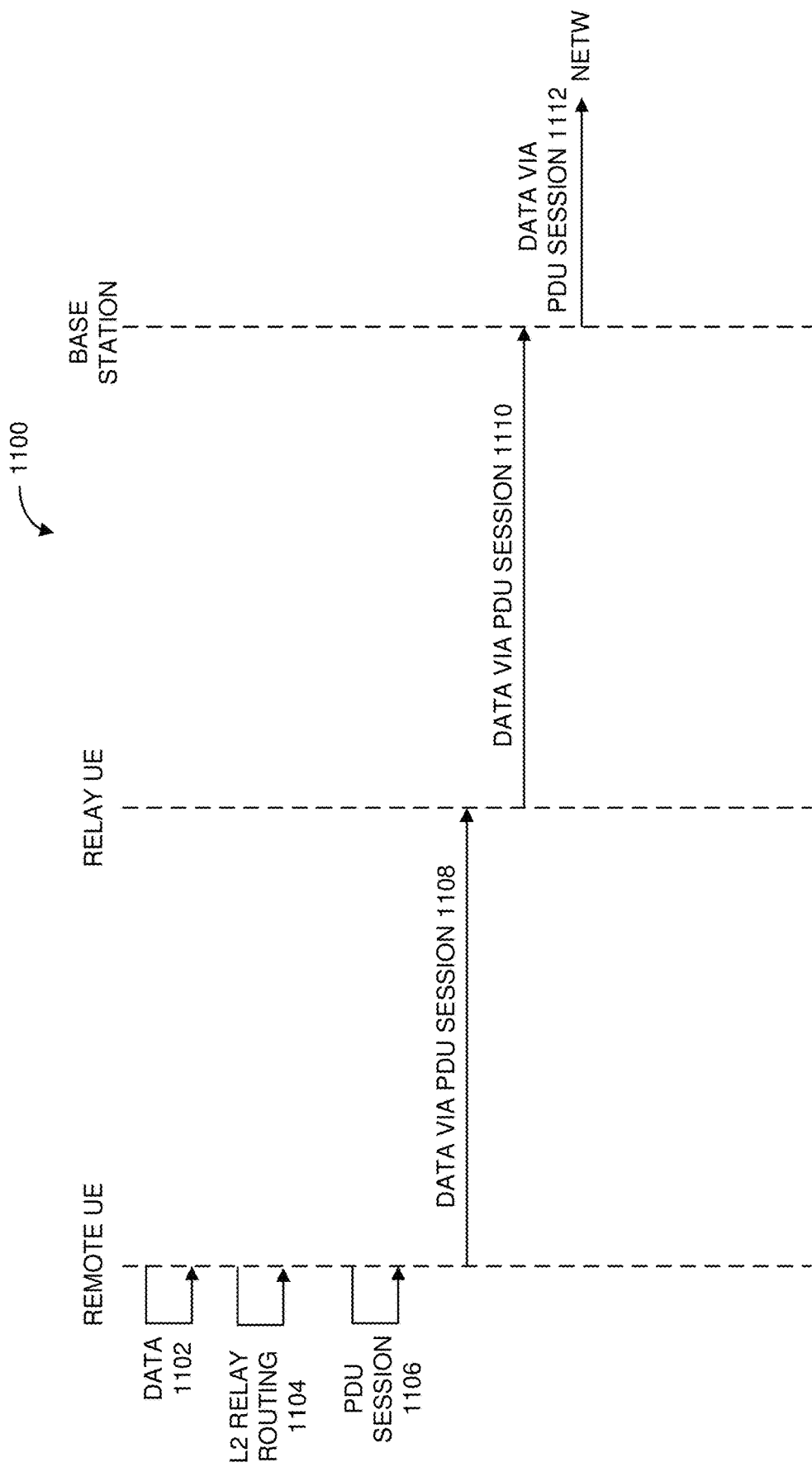
FIG. 11 is a flow chart of an exemplary signaling diagram of routing data from a remote wireless communication device to a network using the L2 relay data routing option according to some aspects.

FIG. 11 is a flow chart of an exemplary signaling diagram of implementing a data transmission from a remote wireless communication device to a network using the L2 relay data routing option according to some aspects. According to the diagram 1100, a remote wireless communication device (e.g., remote UE) generates data for transmission to a network based on an application at 1102.

Then, the remote wireless communication device selects an L2 relay data routing option from among a set of data routing options (e.g., L3 relay, L3 relay with N3IWF, and L2 relay options) for routing the data to the network based on policy control information at 1104. For example, the policy control information may include an application identifier (ID) that identifies the application generating the data per operation 1102. The policy control information may further include a list of route selection descriptors identifying a list of data routing options to be used by the remote wireless communication device to send the data to the network. In this example, the list of route selection descriptions identified the L2 relay data routing option, but could also have identified the L3 and L2 relay data routing options. As an example, URSP rules tables 6.6.2.1-1 and 6.6.2.1-2 from TS 23.503 may be modified to include the L3 relay, L3 relay with N3IWF, and L2 relay data routing options as available data routing options for the application identified by the corresponding application identifier in the table.

The policy control information may specify an access type preference identifying the PC5 layer 2 data routing option. The policy control information may further specify service criteria for the PDU session, such security, privacy, quality of service (QoS), and network loading criteria. The policy control information may further specify validation criteria such as a time window in which the L2 data routing option is available, and/or location where the remote wireless communication device needs to be present for the L2 relay data routing option to be available. As an example, these policy control information may be included in the URSP rules tables 6.6.2.1-1, 6.6.2.1-2, and/or 6.6.2.1-3 from TS 23.503.

Then, the remote wireless communication device establishes a PDU session with a network device (e.g., UPF device) coupled to the network via the relay wireless communication device and the base station at 1106. Further, the remote wireless communication device transmits the data to the relay wireless communication device (e.g., relay UE) via a sidelink for routing the data to the network in accordance with the L2 relay data routing option at 1108. Further, the relay wireless communication device receives the data from the remote wireless communication device, and transmits the data to the base station per the PDU session at 1110. Then, the base station receives the data from the relay wireless communication device, and transmits the data to the network device (e.g., UPF device) per the PDU session at 1112.

In any of the above data routing signaling diagrams 900, 1000, and 1100, the remote wireless communication device may select one of the set of data routing options in response to switching from the cellular routing option (via a Uu link) connection with a base station to the sidelink (PC5) for sending the data to the network via one of the relay options. Alternatively, the remote wireless communication device may select one of the set of data routing options when no data routing option is activated. Further, the remote wireless communication device may select one of the set of data routing options based on the service criteria pertaining to the selected option. Alternatively, the remote wireless communication device may use the corresponding service criteria after selection of the data routing option to set up the option.

Further, in any of the above data routing signaling diagrams 900, 1000, and 1100, the aforementioned policy control information may be situated in the URSP policy, ProSe policy, or partially in the URSP policy and partially in the ProSe policy. Additionally, in the case that the remote wireless communication device multiplexes data from a set of remote wireless communication devices through an adaptation operation, the base station may perform a complementary demultiplexing of the data through a complementary adaptation operation.

Figure 12:
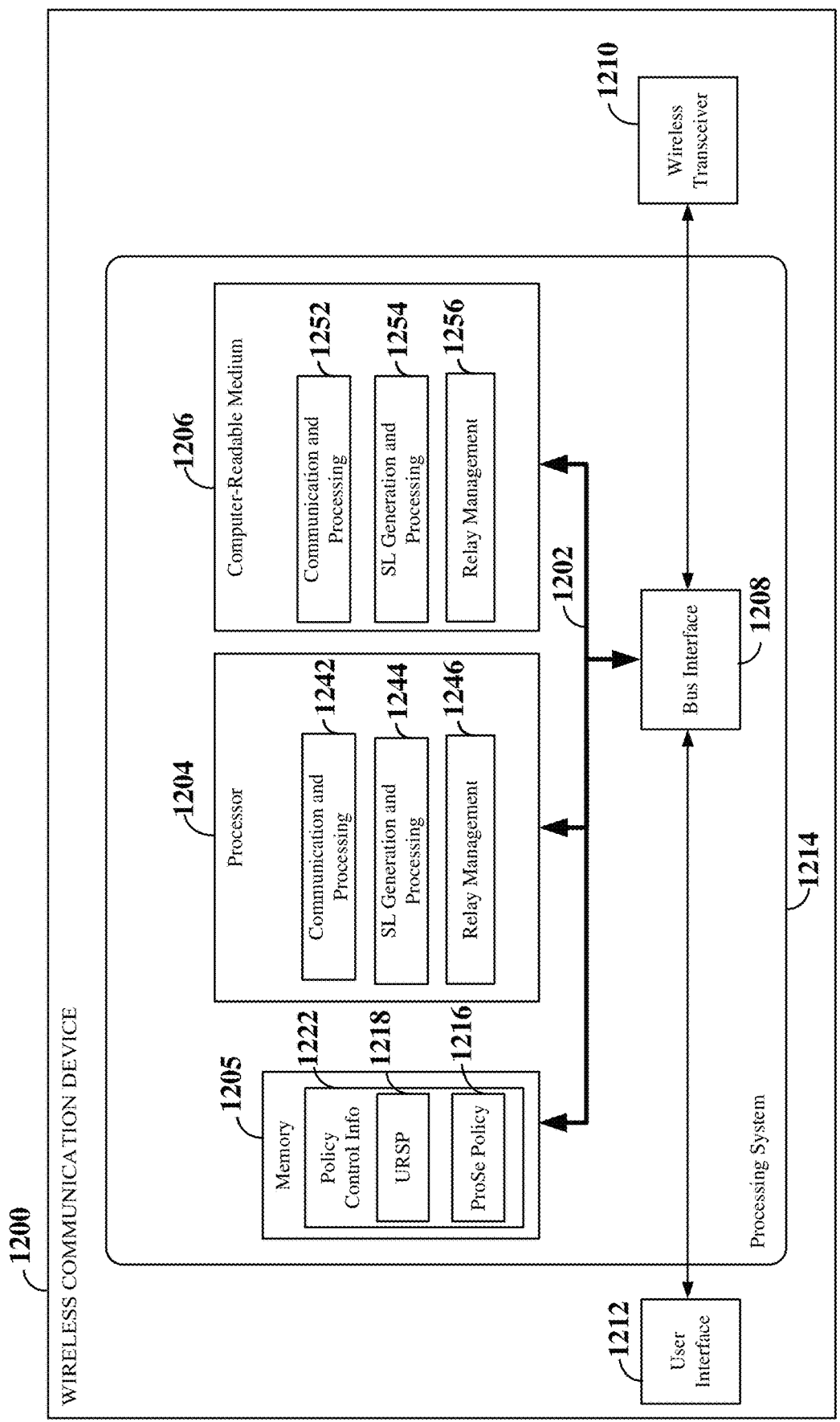
FIG. 12 is a block diagram illustrating an example of a hardware implementation for a wireless communication device employing a processing system according to some aspects.

FIG. 12 is a conceptual diagram illustrating an example of a hardware implementation for an exemplary wireless communication device 1200 employing a processing system 1214. For example, the wireless communication device 1200 may be a user equipment (UE) or other scheduled entity as illustrated in any one or more of FIGS. 1, 2, 4 and/or 5 configured for communication in a wireless communication network (e.g., a 5G NR access network).

The wireless communication device 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1200 may be configured to perform any one or more of the functions described herein. That is, the processor 1204, as utilized in a wireless communication device 1200, may be used to implement any one or more of the processes described below. The processor 1204 may in some instances be implemented via a baseband or modem chip and in other implementations, the processor 1204 may itself comprise a number of devices distinct and different from a baseband or modem chip (e.g., in such scenarios it may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a wireless transceiver 1210. The wireless transceiver 1210 provides a means for communicating with various other apparatus over a transmission medium (e.g., air interface). A user interface 1212 (e.g., keypad, display, touchscreen, speaker, microphone, control knobs, etc.) may also be provided. Of course, such a user interface 1212 is optional, and may be omitted in some examples.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. In some examples, the computer-readable medium 1206 may be part of the memory 1205. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1204 may include a circuitry configured for various functions. For example, the processor 1204 may include communication and processing circuitry 1242 configured to communicate with another wireless communication device (e.g., a relay or remote wireless communication device) or a base station via the wireless transceiver 1210.

For example, the communication and processing circuitry 1242 may be configured to communicate with a base station (e.g., gNB or eNB) via a Uu link and with another wireless communication device via a sidelink. In some examples, the communication and processing circuitry 1242 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1242 may include one or more transmit/receive chains.

In some implementations where the communication involves receiving information, the communication and processing circuitry 1242 may obtain information from a component of the wireless communication device 1200 (e.g., from the transceiver 1210 that receives the information via radio frequency signaling or some other type of signaling suitable for the applicable communication medium), process (e.g., decode) the information, and output the processed information. For example, the communication and processing circuitry 1242 may output the information to another component of the processor 1204, to the memory 1205, or to the bus interface 1208. In some examples, the communication and processing circuitry 1242 may receive one or more of signals, messages, other information, or any combination thereof. In some examples, the communication and processing circuitry 1242 may receive information via one or more channels. In some examples, the communication and processing circuitry 1242 may include functionality for a means for receiving. In some examples, the communication and processing circuitry 1242 may include functionality for a means for processing, including a means for demodulating, a means for decoding, etc.

In some implementations where the communication involves sending (e.g., transmitting) information, the communication and processing circuitry 1242 may obtain information (e.g., from another component of the processor 1204, the memory 1205, or the bus interface 1208), process (e.g., modulate, encode, etc.) the information, and output the processed information. For example, the communication and processing circuitry 1242 may output the information to the transceiver 1210 (e.g., that transmits the information via radio frequency signaling or some other type of signaling suitable for the applicable communication medium). In some examples, the communication and processing circuitry 1242 may send one or more of signals, messages, other information, or any combination thereof. In some examples, the communication and processing circuitry 1242 may send information via one or more channels. In some examples, the communication and processing circuitry 1242 may include functionality for a means for sending (e.g., a means for transmitting). In some examples, the communication and processing circuitry 1242 may include functionality for a means for generating, including a means for modulating, a means for encoding, etc.

In examples, in which the wireless communication device 1200 is a remote wireless communication device, the communication and processing circuitry 1242 may send data to a relay wireless communication device via a sidelink in accordance with a selected one of a set of data routing options. In examples in which the wireless communication device 1200 is a relay wireless communication device, the communication and processing circuitry 1242 may send data received from a relay wireless communication device via a sidelink to a base station via a cellular link in accordance with a selected one of a set of data routing options. The communication and processing circuitry 1242 is further configured to execute a communication and processing instructions (software) 1252 stored in the computer-readable medium 1206 to implement one or more functions described herein.

The processor 1204 may further include a sidelink (SL) generation and processing circuitry 1244 configured to set up a sidelink with another wireless communication device via the wireless transceiver 1210. In examples in which the wireless communication device 1200 is a remote wireless communication device, the SL generation and processing circuitry 1244 may send control signaling to a relay wireless communication device to setup a sidelink in accordance with a selected one of a set of data routing options. In examples in which the wireless communication device 1200 is a relay wireless communication device, the SL generation and processing circuitry 1244 may send control signaling to a remote wireless communication device to setup a sidelink in accordance with a selected one of a set of data routing options. The SL generation and processing circuitry 1244 is further configured to execute a SL generation and processing instructions (software) 1254 stored in the computer-readable medium 1206 to implement one or more functions described herein.

The processor 1204 may further include a relay management circuitry 1246 configured to relay data from one or more wireless communication devices via the wireless transceiver 1210. For example, the relay management circuitry 1246 may relay data received from one or more remote wireless communication device via one or more sidelinks to a base station in accordance with a selected one of a set of data routing options, respectively. The relay management circuitry 1246 is configured to execute a relay management software 1256 stored in the computer-readable medium 1206 to implement one or more functions described herein.

The memory 1205 may include policy control information 1222 for controlling the routing of data from a remote wireless communication device to a core network or base station via a relay wireless communication device. The policy control information 1222 may include UE route selection policy (URSP) 1218 and/or ProSe policy 1216. The communication and processing circuitry 1242 executing the communication and processing software 1252 in the computer-readable medium 1206 may access the policy control information for selecting and configuring a data routing option among a set of data routing options.

Figure 13:
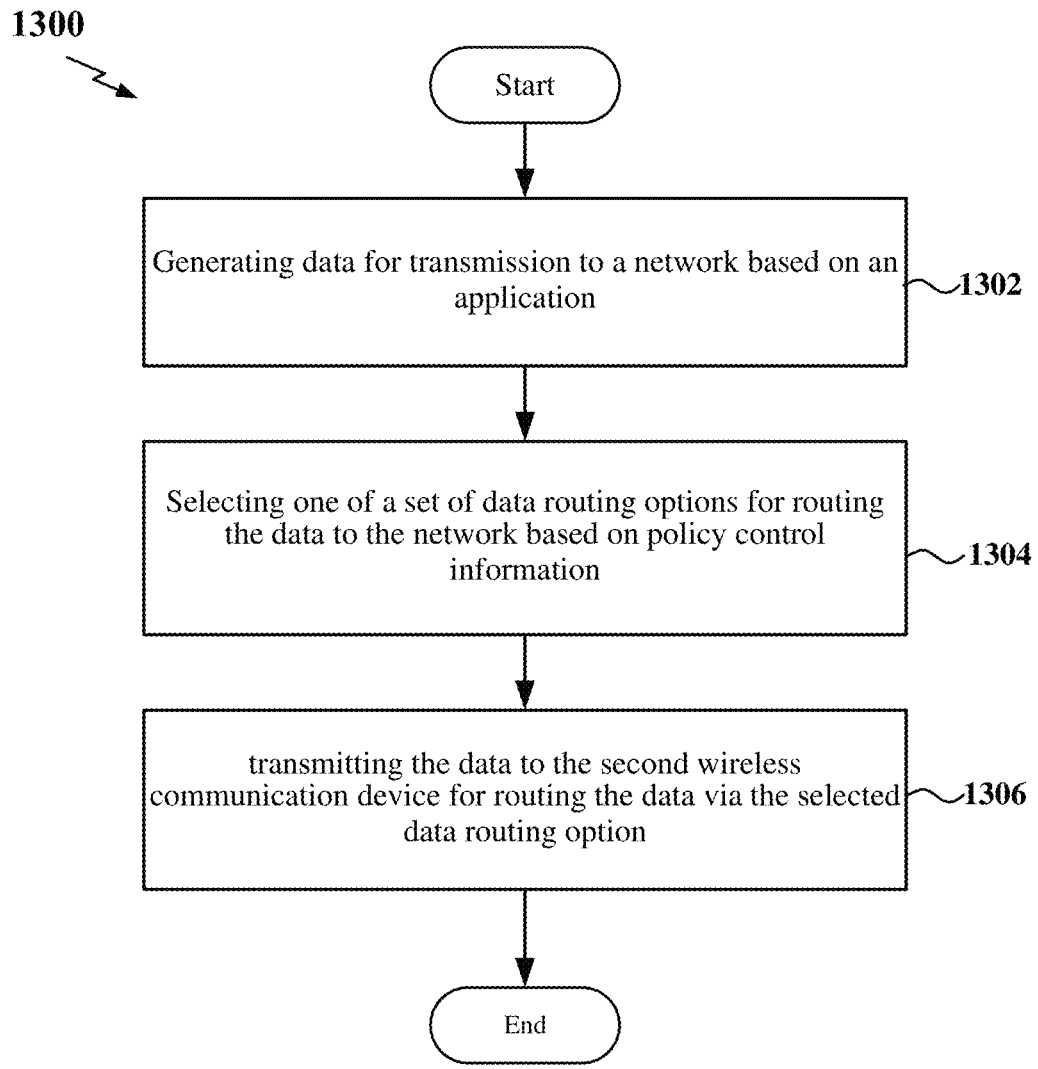
FIG. 13 is a flow chart of an exemplary method for sending data to a network by a remote communication device via a relay data routing option according to some aspects.

FIG. 13 is a flow chart of an exemplary method 1300 for sending data to a network by a first communication device via a relay data routing option according to some aspects. As described below, some or all illustrated features may be omitted in a particular implementation within the scope of the present disclosure, and some illustrated features may not be required for implementation of all examples. In some examples, the process 1300 may be carried out by the wireless communication device 1200 illustrated in FIG. 12. In some examples, the process 1300 may be carried out by any suitable apparatus or means for carrying out the functions or algorithm described below.

The method 1300 includes the wireless communication device generating data for transmission to a network based on an application (block 1302). For example, the communication and processing circuitry 1242 shown and described above in connection with FIG. 12 may provide a means to generate the data.

The method 1300 further includes the wireless communication device selecting one of a set of data routing options for routing the data to the network based on the policy control information (block 1304). Each of the set of data routing options includes routing the data via a second wireless communication device. For example, the communication and processing circuitry 1242 shown and described above in connection with FIG. 12 may provide a means to select one of the set of data routing options.

Additionally, the method 1300 includes the wireless communication device transmitting the data to the second wireless communication device for routing the data via the selected data routing option (block 1306). For example, the SL generation and processing circuitry 1244 shown and described above in connection with FIG. 12 may provide means to transmit the data to the second wireless communication device.

Figure 14:
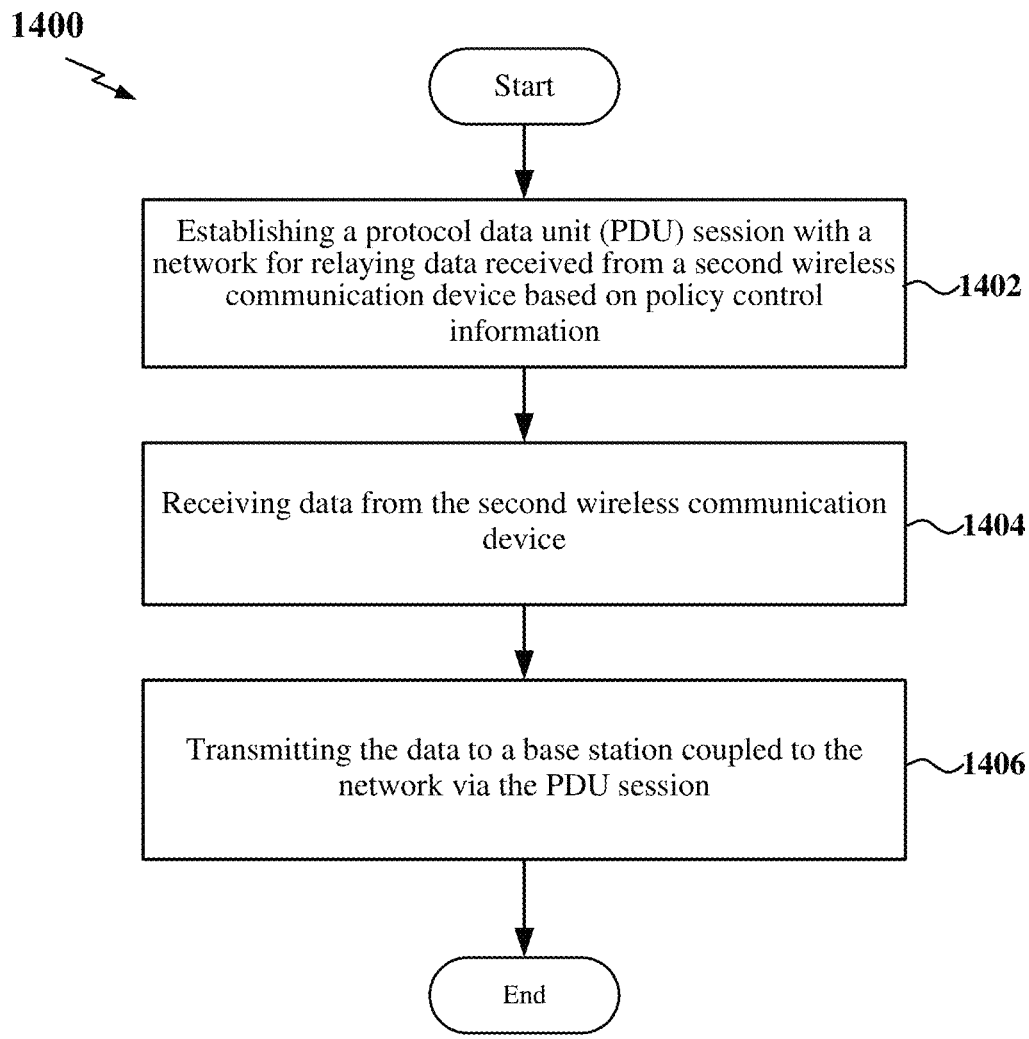
FIG. 14 is a flow chart of an exemplary method for relaying data from a remote wireless communication device to a network by a relay wireless communication device via a relay data routing option according to some aspects.

FIG. 14 is a flow chart of an exemplary method 1400 for relaying data by a first wireless device from a second wireless communication device to a network via a data routing option according to some aspects. As described below, some or all illustrated features may be omitted in a particular implementation within the scope of the present disclosure, and some illustrated features may not be required for implementation of all examples. In some examples, the process 1400 may be carried out by the wireless communication device 1200 illustrated in FIG. 12. In some examples, the process 1400 may be carried out by any suitable apparatus or means for carrying out the functions or algorithm described below.

The method 1400 includes the wireless communication device establishing a protocol data unit (PDU) session with the network for relaying data received from the second wireless communication device based on policy control information (block 1402). For example, the communication and processing circuitry 1242 shown and described above in connection with FIG. 12 may provide a means to establish a protocol data unit (PDU) session.

The method 1400 further includes the wireless communication device receiving data from the second wireless communication device (block 1404). For example, the SL generation and processing circuitry 1244 shown and described above in connection with FIG. 12 may provide means to receive data from the second wireless communication device via a sidelink.

The method 1400 further includes the wireless communication device transmitting the data to a base station coupled to the network via the PDU session (block 1406). For example, the communication and processing circuitry 1242 shown and described above in connection with FIG. 12 may provide a means to transmit the data to a base station.

Figure 15:
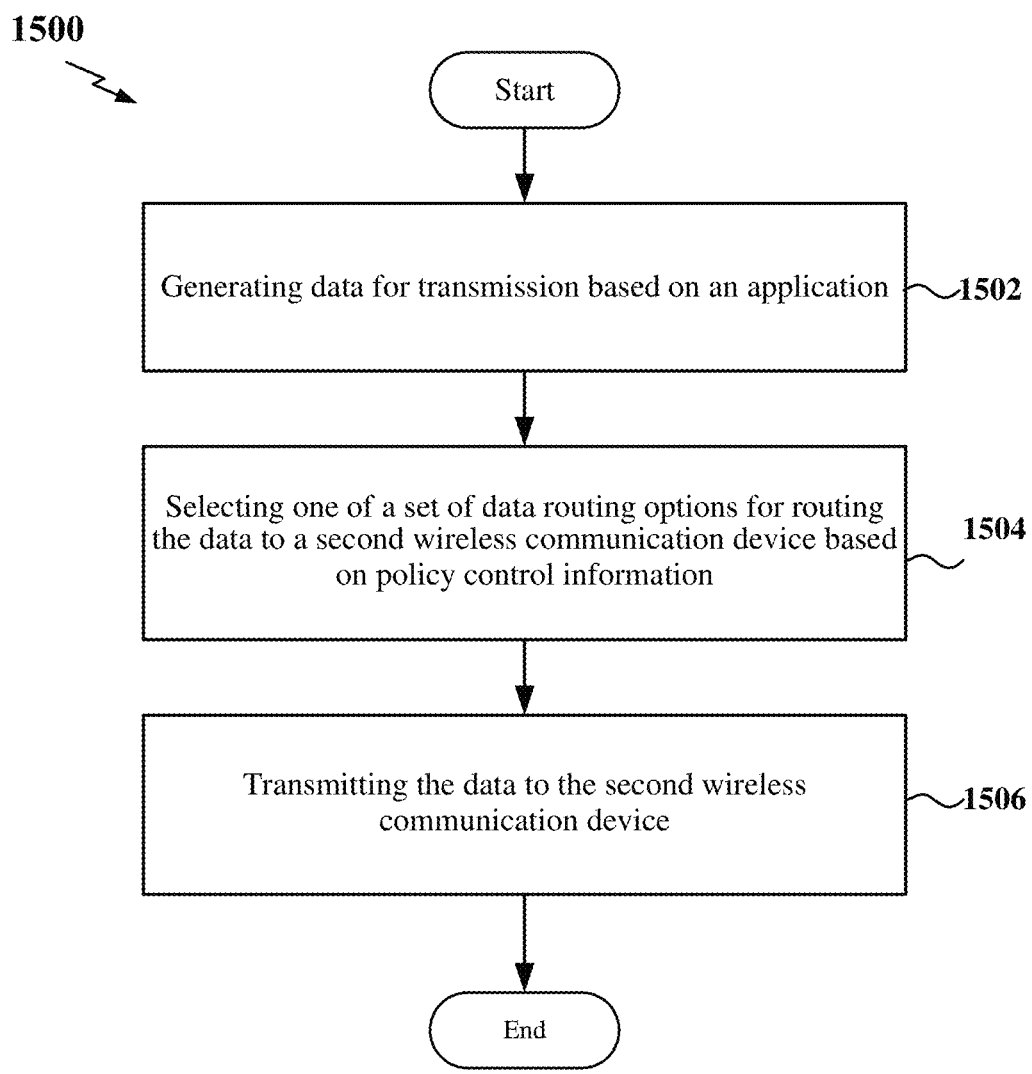
FIG. 15 is a flow chart of an exemplary method for sending data from a first wireless communication device to a second wireless communication device via a sidelink routing option according to some aspects.

FIG. 15 is a flow chart of an exemplary method 1500 for transmitting data by a first wireless device to a second wireless communication device data routing option according to some aspects. As described below, some or all illustrated features may be omitted in a particular implementation within the scope of the present disclosure, and some illustrated features may not be required for implementation of all examples. In some examples, the process 1500 may be carried out by the wireless communication device 1200 illustrated in FIG. 12. In some examples, the process 1500 may be carried out by any suitable apparatus or means for carrying out the functions or algorithm described below.

The method 1500 includes a first wireless communication device generating data for transmission based on an application (block 1502). For example, the communication and processing circuitry 1242 shown and described above in connection with FIG. 12 may provide a means to generate the data.

The method 1500 further includes the first wireless communication device selecting one of a set of data routing options for routing the data to a second wireless communication device based on the policy control information (block 1504). For example, the communication and processing circuitry 1242 shown and described above in connection with FIG. 12 may provide a means to select one of the set of data routing options.

Additionally, the method 1500 includes the first wireless communication device transmitting the data to the second wireless communication device (block 1506). For example, the SL generation and processing circuitry 1244 shown and described above in connection with FIG. 12 may provide means to transmit the data to the second wireless communication device.

Figure 16:
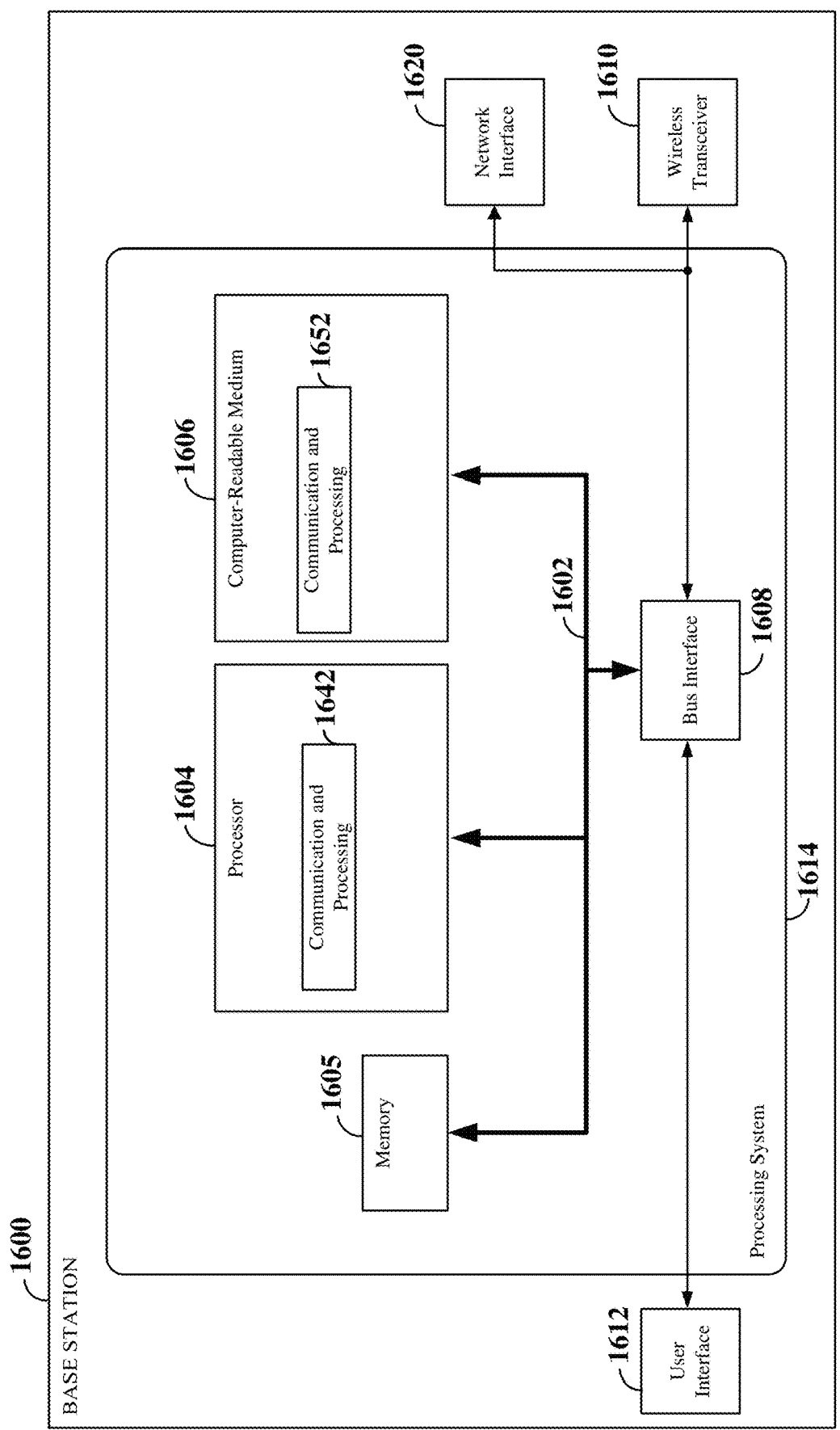
FIG. 16 is a block diagram illustrating an example of a hardware implementation for a base station employing a processing system according to some aspects.

FIG. 16 is a conceptual diagram illustrating an example of a hardware implementation for an exemplary base station 1600 employing a processing system 1614. For example, the base station 1600 may be a user equipment (UE) or other scheduled entity as illustrated in any one or more of FIGS. 1, 2, 4 and/or 5 configured for communication in a wireless communication network (e.g., a 5G NR access network).

The base station 1600 may be implemented with a processing system 1614 that includes one or more processors 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1600 may be configured to perform any one or more of the functions described herein. That is, the processor 1604, as utilized in a base station 1600, may be used to implement any one or more of the processes described below. The processor 1604 may in some instances be implemented via a baseband or modem chip and in other implementations, the processor 1604 may itself comprise a number of devices distinct and different from a baseband or modem chip (e.g., in such scenarios may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, will not be described any further. A bus interface 1608 provides an interface between the bus 1602, a wireless transceiver 1610, and network interface 1620. The wireless transceiver 1610 provides a means for communicating with various other apparatus over a transmission medium (e.g., air interface). The network interface 1620 provides a means for communicating with various other network devices over control plane (e.g., N2) and user plane (e.g., N3) communication links A user interface 1612 (e.g., keypad, display, touchscreen, speaker, microphone, control knobs, etc.) may also be provided. Of course, such a user interface 1612 is optional, and may be omitted in some examples.

The processor 1604 is responsible for managing the bus 1602 and general processing, including the execution of software stored on the computer-readable medium 1606. The software, when executed by the processor 1604, causes the processing system 1614 to perform the various functions described below for any particular apparatus. The computer-readable medium 1606 and the memory 1605 may also be used for storing data that is manipulated by the processor 1604 when executing software.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1606.

The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. In some examples, the computer-readable medium 1606 may be part of the memory 1605. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1604 may include a circuitry configured for various functions. For example, the processor 1604 may include communication and processing circuitry 1642 configured to communicate with a relay wireless communication device via the wireless transceiver 1610 and a network device via the network interface 1620. For example, the communication and processing circuitry 1642 may receive data from a relay wireless communication device via a cellular link (Uu) in accordance with a selected one of a set of data routing options. The data originates from a remote wireless communication device. The communication and processing circuitry 1642 may send the data from the relay wireless communication device to a network device via the network interface 1620 in accordance with a selected one of a set of data routing options. The communication and processing circuitry 1642 is configured to execute a communication and processing software 1652 stored in the computer-readable medium 1606 to implement one or more functions described herein.

Figure 17:
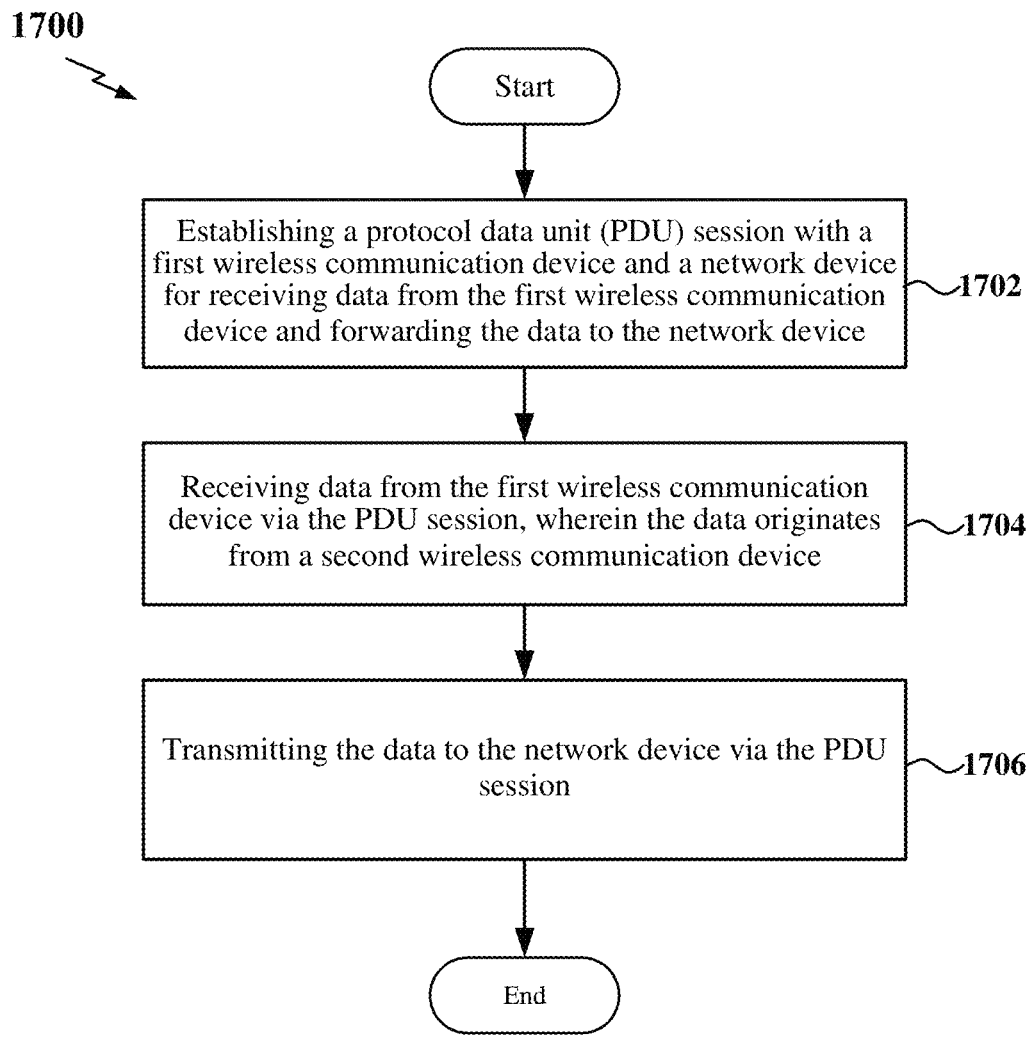
FIG. 17 is a flow chart of another exemplary method for relaying data from a remote wireless communication device received via a relay wireless communication device to a network via a relay data routing option according to some aspects.

FIG. 17 is a flow chart of another exemplary method 1700 for relaying data from a remote wireless communication device received via a relay wireless communication device to a network via a selected data routing option according to some aspects. As described below, some or all illustrated features may be omitted in a particular implementation within the scope of the present disclosure, and some illustrated features may not be required for implementation of all examples. In some examples, the process 1700 may be carried out by the wireless communication device 1600 illustrated in FIG. 16. In some examples, the process 1700 may be carried out by any suitable apparatus or means for carrying out the functions or algorithm described below.

The method 1700 includes the base station establishing a protocol data unit (PDU) session with a first wireless communication device and a network device for receiving data from the first wireless communication device and forwarding the data to the network device (block 1702). For example, the communication and processing circuitry 1642 shown and described above in connection with FIG. 16 may provide a means to establish a protocol data unit (PDU) session.

The method 1700 further includes the base station receiving data from the first wireless communication device via the PDU session (block 1704). The data may have originated from a second wireless communication device. For example, the communication and processing circuitry 1642 shown and described above in connection with FIG. 16 may provide a means to receive the data from the first wireless communication device via the PDU session.

Additionally, the method 1700 includes the base station transmitting the data to the network device via the PDU session (block 1706). For example, the communication and processing circuitry 1642 shown and described above in connection with FIG. 16 may provide a means to transmit the data to the network device.

Figure 18:
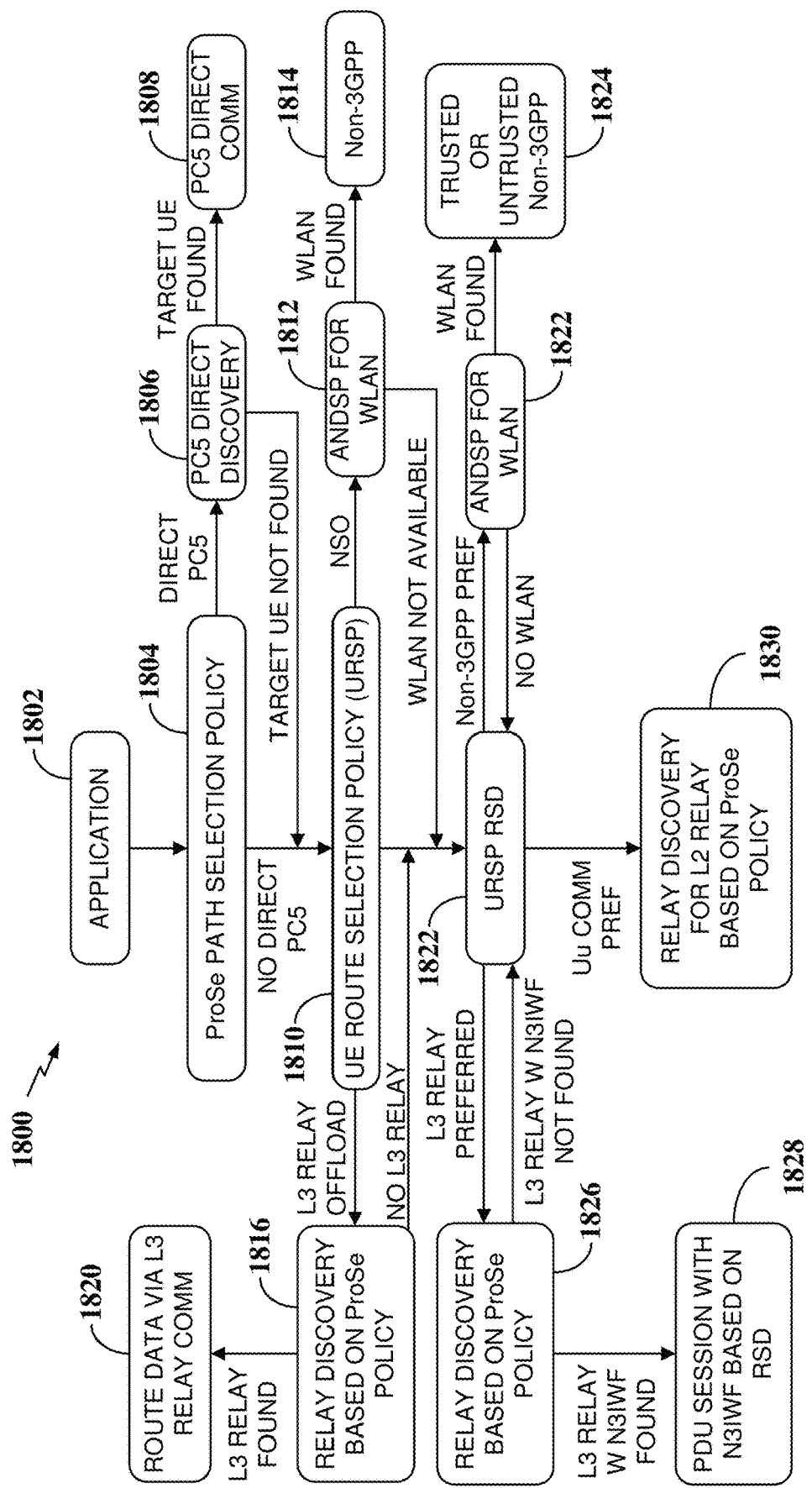
FIG. 18 is a flow chart depicting a method of selecting an application data route to a target device according to some aspects.

FIG. 18 is a flow chart depicting a method 1800 of selecting an application data route to a target device according to some aspects. According to the method 1800, a UE may be running an application that generates data for transmission to a target device or entity (block 1802). Then, according to the method 1800, the UE may consult a ProSe path selection policy stored in an internal memory (block 1804). If the application data is to be routed directly to another UE via a direct sidelink (e.g., a PCT link) (without being routed via the network), the UE then performs sidelink (PC5) direct device discovery (block 1806). If the UE discovers the target device in block 1806, then, according to the method 1800, the UE establishes a PC5 communication link (sidelink) to the target device (block 1808). If the UE does not discover the target device in block 1806, the UE proceeds to block 1810 in accordance with the method 1800.

If in block 1804, it is determined, after consulting the ProSe path selection policy, that the application data is not to be routed via a direct PC5 link or if a direct PC5 target device is not discovered in block 1806 (e.g., the application data has to go to the target device or entity via the network), then, according to the method 1800, the UE may consult a UE route selection policy (URSP) stored in an internal memory (block 1810). Based on consulting the URSP, the UE may perform a non-seamless offload (NSO) to a wireless local area network (WLAN) via an Access Network Discovery and Selection Policy (ANDSP) (block 1812). If a WLAN is discovered, the UE establishes a non-3GPP communication link via the WLAN to route the data to the target device or entity via the network (block 1814). If a WLAN is not discovered in block 1812, the UE may proceed to block 1822.

Alternatively, based on consulting the URSP in block 1810, the UE may perform a layer 3 (L3) relay non-seamless offload to via a relay wireless communication device (block

1816). The L3 relay non-seamless offload has been discussed in detail in the description of FIGS. 6A-6B. In this regard, the UE performs a discovery of a relay wireless communication device based on a ProSe policy (block 1816). If a relay wireless communication device is found, the UE may establish a sidelink with the relay wireless communication device as discussed with reference to FIG. 6A, and route the application data to a target device or entity via the relay wireless communication device and network as discussed with reference to FIG. 6B (block 1820). If no relay wireless communication device is discovered per block 1816, the UE may proceed to block 1822. As discussed above, a PDU session may not extend to the UE in a non-seamless offload scenario.

Further, according to the method 1800, if non-seamless offloading is not available in block 1810, the UE may consult a URSP route selection descriptor (RSD), which may also be stored in an internal memory (block 1822). Based on consulting the URSP RSD, the UE may prefer a non-3GPP access type data transmission to the target device or entity via a ANDSP for WLAN 1822. If a WLAN is discovered in block 1822, the UE establishes a communication link with a trusted or untrusted non-3GPP via the WLAN to route the data to the target device or entity via a PDU session (block 1824). If a WLAN is not discovered in block 1822, the UE may return back to block 1822 to determine if another option is available.

In block 1822, according to the method 1800, the UE may select an L3 relay with N3IWF access type data routing option, as discussed in detail with reference to FIGS. 7A-7B. In this regard, the UE performs a discovery of a relay wireless communication device based on a ProSe policy (block 1826). If a relay wireless communication device is found, the UE establishes a PDU session communication link with the N3IWF network device via the relay wireless communication device, base station, and network as explained with reference to FIG. 7A, and performs application data communication in a PDU session via the relay wireless communication device, base station, UPF, and N3IWF network device as explained with reference to FIG. 7B (block 1828). If no relay wireless communication device is found in block 1826, the UE may return back to block 1822 to determine if another option is available.

In block 1822, according to the method 1800, the UE may select an L2 relay access type data routing option, as discussed in detail with reference to FIGS. 8A-8B. In this regard, the UE performs a discovery of a relay wireless communication device based on a ProSe policy and sets up a NAS communication link with the network as discussed in detail with reference to FIG. 8A, and performs application data communication with the network via the relay wireless communication device and a base station as discussed in detail with reference to FIG. 8B (block 1830).

The following provides an overview of aspects of the present disclosure:

Aspect 1: A method for wireless communication implemented at a first wireless communication device, the method including: generating data for transmission to a network based on an application; selecting one of a set of data routing options for routing the data to the network based on policy control information, wherein each of the set of data routing options includes routing the data via a second wireless communication device; and transmitting the data to the second wireless communication device for routing the data via the selected data routing option.

Aspect 2: The method of aspect 1, wherein selecting one of the set of data routing options includes selecting a layer 3 relay routing option.

Aspect 3: The method of aspect 2, wherein the policy control information includes an application identifier identifying the application, and a list of route selection descriptors identifying the layer 3 relay routing option as available for routing data generated based on the application.

Aspect 4: The method of aspect 2 or 3, wherein the policy control information includes a non-seamless offload indication indicating that the data associated with the application identifier is to be transmitted to the second wireless communication device outside of a protocol data unit (PDU) session.

Aspect 5: The method of any one of aspects 2-4, wherein the policy control information includes a sidelink relay non-seamless offload indication indicating that the data associated with the application identifier is to be transmitted to the second wireless communication device outside of a protocol data unit (PDU) session.

Aspect 6: The method of any one of aspects 3-5, further including establishing the sidelink to the second wireless communication device including performing layers 1, 2, and 3 proximity service (ProSe) (PC5) protocol stack operations.

Aspect 7: The method of aspect 6, wherein: performing the layer 3 PC5 protocol operation includes performing a signaling (PC5-S) operation and a radio resource control (PC5-RRC) operation; performing the layer 2 PC5 protocol operation includes performing a packet data convergence protocol (PC5-PDCP) operation, a radio link control (PC5-RLC) operation, and a media access control (PC5-MAC) operation; and performing the layer 1 PC5 protocol operation includes a performing physical (PC5-PHY) operation.

Aspect 8: The method of any one of aspects 1-7, wherein the layer 3 relay routing option does not include a non-access stratum (NAS) connection with the network or an access stratum (AS) connection to a base station coupled to the network.

Aspect 9: The method of any one of aspects 1-7, further including: generate an internet protocol (IP) packet including the data; and processing the IP packet via proximity service (ProSe) (PC5) protocol stack operations prior to transmission of the IP packet to the second wireless communication device.

Aspect 10: The method of aspect 9, further including receiving an IP address from the second wireless communication device, wherein the IP address identifies the first wireless communication device as originator of the IP packet, wherein generating the IP packet includes including the IP address in the IP packet.

Aspect 11: The method of aspect 1, wherein selecting one of the set of data routing options includes selecting a layer 3 relay with a non-3$^{rd}$ Generation Partnership Project (3GPP) Interworking Function (N3IWF) routing option.

Aspect 12: The method of aspect 11, wherein the data routed via the layer 3 relay with N3IWF data routing option occurs over a protocol data unit (PDU) session with an N3IWF network device coupled to the network.

Aspect 13: The method of aspect 12, wherein the policy control information includes a session and service continuity (SSC) mode specifying that an IP address identifying the first wireless communication device per the PDU session is to be preserved.

Aspect 14: The method of aspect 12 or 13, wherein the policy control information includes a network slice selection (NSS) identifying one or more network slices over which the PDU session is taking place.

Aspect 15: The method of any one of aspects 12-14, wherein the policy control information includes a data network name (DNN) identifying the PDU session.

Aspect 16: The method of any one of aspects 12-15, wherein the policy control information includes an access type preference identifying the layer 3 relay with N3IWF data routing option.

Aspect 17: The method of any one of aspects 12-16, wherein the policy control information specifies one or more of the following: a time window in which the layer 3 relay with N3IWF data routing option is available, a location in which the first wireless communication device needs to be present for the layer 3 relay with N3IWF data routing option to be available, or service criteria for the layer 3 relay with N3IWF data routing option.

Aspect 18: The method of aspect 17, wherein the service criteria include one or more of the following: security criteria, privacy criteria, quality of service (QoS) criteria, or network loading criteria.

Aspect 19: The method of aspect 17 or 18, wherein selecting the layer 3 relay with N3IWF data routing option is based on the service criteria.

Aspect 20: The method of any one of aspects 17-19, further including configuring the PDU session with the service criteria after selecting the layer 3 relay with N3IWF data routing option.

Aspect 21: The method of any one of aspects 12-20, wherein the layer 3 relay with N3IWF data routing option includes a non-access stratum (NAS) connection with the network and an access stratum (AS) connection with a base station via the second wireless communication device.

Aspect 22: The method of any one of aspects 12-21, further including establishing the sidelink to the second wireless communication device including performing layers 1 and 2 proximity service (ProSe) (PC5) protocol stack operations.

Aspect 23: The method of any one of aspects 12-22, further including: generating a PDU packet including the data; and processing the PDU packet via proximity service (ProSe) (PC5) protocol stack operations prior to transmission of the PDU packet to the second wireless communication device.

Aspect 24: The method of aspect 1, wherein selecting one of the set of data routing options includes selecting a layer 2 relay routing option.

Aspect 25: The method of aspect 24, wherein the policy control information includes a network slice selection (NSS) identifying one or more network slices over which the PDU session is taking place.

Aspect 26: The method of aspect 24 or 25, wherein the policy control information includes a data network name (DNN) identifying the PDU session.

Aspect 27: The method of any one of aspects 24-26, wherein the policy control information includes an access type preference identifying the layer 2 relay routing option.

Aspect 28: The method of any one of aspects 24-27, wherein the policy control information specifies one or more of the following: a time window in which the layer 2 relay routing option, a location in which the first wireless communication device needs to be present to use the layer 2 relay routing option, or service criteria for the layer 2 relay routing option.

Aspect 29: The method of any one of aspects 24-28, wherein selecting the layer 2 relay routing option based on the service criteria.

Aspect 30: The method of any one of aspects 24-29, further including configuring a PDU session with the service criteria after selecting the layer 2 relay routing option.

Aspect 31: The method of any one of aspects 24-30, wherein the layer 2 routing option includes a non-access stratum (NAS) connection and an access stratum connection with the network via the second wireless communication device.

Aspect 32: The method of any one of aspects 24-31, further including establishing the sidelink to the second wireless communication device including performing layers 1 and 2 proximity service (ProSe) (PC5) protocol stack operations.

Aspect 33: The method of any one of aspects 24-32, further including: generating a PDU packet including the data; and processing the PDU packet via new radio (NR) protocol stack operations and (ProSe) (PC5) protocol stack operations prior to transmission of the PDU packet to the second wireless communication device.

Aspect 34: The method of any one of aspects 1-33, wherein selecting the one of a set of data routing options is in response to switching from a cellular routing option.

Aspect 35: The method of any one of aspects 1-34, wherein selecting the one of a set of data routing options occurs when no routing option for the data is activated.

Aspect 36: The method of any one of aspects 1-35, wherein the policy control information is situated in one or more of the following: a UE route selection policy (URSP) or a proximity service (ProSe) policy.

Aspect 37: A first wireless communication device in a wireless communication network comprising a wireless transceiver, a memory, and a processor coupled to the wireless transceiver and the memory, the processor and the memory configured to perform a method of any one of aspects 1 through 36.

Aspect 38: A first wireless communication device in a wireless communication network comprising at least one means for performing a method of any one of aspects 1 through 36.

Aspect 39: A non-transitory computer-readable medium storing computer-executable code, comprising code for causing a first wireless communication device to perform a method of any one of aspects 1 through 36.

Aspect 40: A method for wireless communication implemented at a first wireless communication device, the method including: establishing a protocol data unit (PDU) session with a network for relaying data received from a second wireless communication device based on policy control information; receiving data from the second wireless communication device via a sidelink; and transmitting the data to a base station coupled to the network via the PDU session.

Aspect 41: The method of aspect 40, wherein the policy control information includes a session and service continuity (SSC) mode specifying a service continuity for the PDU session is to be preserved.

Aspect 42: The method of aspect 40 or 41, wherein the policy control information includes a network slice selection (NSS) identifying one or more network slices over which the PDU session is taking place.

Aspect 43: The method of any one of aspects 40-42, wherein the policy control information includes a data network name (DNN) identifying the PDU session.

Aspect 44: The method of any one of aspects 40-43, wherein the policy control information is situated in a UE route selection policy (URSP).

Aspect 45: The method of any one of aspects 40-44, wherein receiving the data from the second wireless communication device occurs outside of the PDU session.

Aspect 46: The method of aspect 45, further including: processing the data received from the second wireless communication device via layers 1, 2, and 3 proximity service (ProSe) (PC5) protocol stack operations; and processing the data for transmission to the base station via layers 1, 2, and 3 new radio (NR) protocol stack operations.

Aspect 47: The method of aspect 45 or 46, further including: processing the data received from the second wireless communication device via layers 1 and 2 proximity service (ProSe) (PC5) protocol stack operations; and processing the data for transmission to the base station via layers 1 and 2 new radio (NR) protocol stack operations.

Aspect 48: The method of any one of aspects 40-47, further including performing adaptation relay processing to multiplex the data received from the second wireless communication device with data received from one or more other wireless communication devices for transmission to the base station via the PDU session.

Aspect 49: A first wireless communication device in a wireless communication network comprising a wireless transceiver, a memory, and a processor coupled to the wireless transceiver and the memory, the processor and the memory configured to perform a method of any one of aspects 40 through 48.

Aspect 50: A first wireless communication device in a wireless communication network comprising at least one means for performing a method of any one of aspects 40 through 48.

Aspect 51: A non-transitory computer-readable medium storing computer-executable code, comprising code for causing a first wireless communication device to perform a method of any one of aspects 40 through 48.

Aspect 52: A method for wireless communication implemented at a base station, the method including: establishing a protocol data unit (PDU) session with a first wireless communication device and a network device for receiving data from the first wireless communication device and forwarding the data to the network device; receiving data from the first wireless communication device via the PDU session, wherein the data originates from a second wireless communication device; and transmitting the data to the network device via the PDU session.

Aspect 53: The method of aspect 52, wherein the network device includes a non-3$^{rd}$ Generation Partnership Project (3GPP) Interworking Function (N3IWF) network device.

Aspect 54: The method of aspect 52 or 53, wherein the PDU session extends to the second wireless communication device.

Aspect 55: The method of aspect 52 or 54, wherein the PDU session does not extend to the second wireless communication device.

Aspect 56: The method of any one of aspects 52-55, further including performing adaptation layer processing to demultiplex the data originating from the second wireless communication device from data originating from one or more other wireless communication devices.

Aspect 57: A base station in a wireless communication network comprising a wireless transceiver, a memory, and a processor coupled to the wireless transceiver and the memory, the processor and the memory configured to perform a method of any one of aspects 52 through 56.

Aspect 58: A base station in a wireless communication network comprising at least one means for performing a method of any one of aspects 52 through 56.

Aspect 59: A non-transitory computer-readable medium storing computer-executable code, comprising code for causing a base station to perform a method of any one of aspects 52 through 56.

Aspect 60: A method for wireless communication implemented at a first wireless communication device, the method including: generating data for transmission based on an application; selecting one of a set of data routing options for routing the data to a second wireless communication device based on policy control information; and transmitting the data to the second wireless communication device via a sidelink.

Aspect 61: The method of aspect 60, wherein the policy control information includes a non-seamless offload indication indicating that the data associated with the application identifier is to be transmitted to the second wireless communication device outside of a protocol data unit (PDU) session.

Aspect 62: The method of aspect 60 or 61, wherein the policy control information includes a sidelink relay non-seamless offload indication indicating that the data associated with the application identifier is to be transmitted to the second wireless communication device outside of a protocol data unit (PDU) session.

Aspect 63: The method of any one of aspects 60-62, wherein the policy control information includes an access type preference identifying a PC5 data routing option.

Aspect 64: A first wireless communication device in a wireless communication network comprising a wireless transceiver, a memory, and a processor coupled to the wireless transceiver and the memory, the processor and the memory configured to perform a method of any one of aspects 60 through 63.

Aspect 65: A first wireless communication device in a wireless communication network comprising at least one means for performing a method of any one of aspects 60 through 63.

Aspect 66: A non-transitory computer-readable medium storing computer-executable code, comprising code for causing a first wireless communication device to perform a method of any one of aspects 60 through 63.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1, 2, 4, and/or 5 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first wireless communication device, comprising:
   one or more memories; and
   one or more processors coupled to the one or more memories, wherein the one or more processors are configured to cause the first wireless communication device to:
   generate data for transmission to a network based on an application;
   select one of a set of data routing options as a selected data routing option for routing the data to the network based on policy control information, wherein each of the set of data routing options includes routing the data to the network via a second wireless communication device, wherein each data routing option of the set of data routing options utilizes a different combination of a layer option on which layer to utilize for routing communication from the second wireless communication device to the network and a protocol data unit (PDU) option on whether to utilize a PDU session; and
   transmit the data to the second wireless communication device for routing the data via the selected data routing option.

2. The first wireless communication device of claim 1, wherein the one or more processors are configured to cause the first wireless communication device to transmit the data to the second wireless communication device via a sidelink.

3. The first wireless communication device of claim 1, wherein the selected data routing option comprises a layer 3 relay routing option.

4. The first wireless communication device of claim 3, wherein the policy control information includes:
   an application identifier identifying the application, and a list of route selection descriptors identifying the layer 3 relay routing option as available for routing data generated based on the application;
   a non-seamless offload indication indicating that the data associated with the application identifier is to be transmitted to the second wireless communication device outside of a protocol data unit (PDU) session; and
   a sidelink relay non-seamless offload indication indicating that the data associated with the application identifier is to be transmitted to the second wireless communication device outside of a protocol data unit (PDU) session.

5. The first wireless communication device of claim 3, wherein the one or more processors are configured to cause the first wireless communication device to perform layers 1, 2, and 3 proximity service (ProSe) (PC5) protocol stack operations to establish a sidelink to the second wireless communication device; wherein:
   the layer 3 PC5 protocol operation includes a signaling (PC5-5) operation and a radio resource control (PC5-RRC) operation;
   the layer 2 PC5 protocol operation includes a packet data convergence protocol (PC5-PDCP) operation, a radio link control (PC5-RLC) operation, and a media access control (PC5-MAC) operation; and
   the layer 1 PC5 protocol operation includes a PC5 physical layer (PC5-PHY) operation.

6. The first wireless communication device of claim 3, wherein the one or more processors are configured to cause the first wireless communication device to:
   generate an internet protocol (IP) packet including the data;
   processes the IP packet via proximity service (ProSe) (PC5) protocol stack operations prior to transmission of the IP packet to the second wireless communication device;

receive an IP address from the second wireless communication device, wherein the IP address identifies the first wireless communication device as originator of the IP packet; and
generate the IP packet to include the IP address.

7. The first wireless communication device of claim 1, wherein the selected one of the set of data routing options includes a layer 3 relay with a non-3$^{rd}$ Generation Partnership Project (3GPP) Interworking Function (N3IWF) routing option.

8. The first wireless communication device of claim 7, wherein the data routed via the layer 3 relay with N3IWF data routing option occurs over a protocol data unit (PDU) session with an N3IWF network device coupled to the network.

9. The first wireless communication device of claim 8, wherein the policy control information includes:
a session and service continuity (SSC) mode specifying that an IP address identifying the first wireless communication device per the PDU session is to be preserved;
a network slice selection (NSS) identifying one or more network slices over which the PDU session is taking place;
a data network name (DNN) identifying the PDU session; and
an access type preference identifying the layer 3 relay with N3IWF data routing option.

10. The first wireless communication device of claim 1, wherein the selected one of the set of data routing options includes a layer 2 relay routing option.

11. A method for wireless communication implemented at a first wireless communication device, the method comprising:
generating data for transmission to a network based on an application;
selecting one of a set of data routing options as a selected data routing option for routing the data to the network based on policy control information, wherein each of the set of data routing options includes routing the data to the network via a second wireless communication device, wherein each data routing option of the set of data routing options utilizes a different combination of a layer option on which layer to utilize for routing communication from the second wireless communication device to the network and a protocol data unit (PDU) option on whether to utilize a PDU session; and
transmitting the data to the second wireless communication device for routing the data via the selected data routing option.

12. The method of claim 11, wherein the data is transmitted to the second wireless communication device via a sidelink.

13. The method of claim 11, wherein the selected data routing option comprises a layer 3 relay routing option.

14. The method of claim 13, wherein the policy control information includes:
an application identifier identifying the application, and a list of route selection descriptors identifying the layer 3 relay routing option as available for routing data generated based on the application;
a non-seamless offload indication indicating that the data associated with the application identifier is to be transmitted to the second wireless communication device outside of a protocol data unit (PDU) session; and
a sidelink relay non-seamless offload indication indicating that the data associated with the application identifier is to be transmitted to the second wireless communication device outside of a protocol data unit (PDU) session.

15. The method of claim 13, further comprising establishing a sidelink to the second wireless communication device including performing layers 1, 2, and 3 proximity service (ProSe) (PC5) protocol stack operations, wherein:
performing the layer 3 PC5 protocol operation includes performing a signaling (PC5-S) operation and a radio resource control (PC5-RRC) operation;
performing the layer 2 PC5 protocol operation includes performing a packet data convergence protocol (PC5-PDCP) operation, a radio link control (PC5-RLC) operation, and a media access control (PC5-MAC) operation; and
performing the layer 1 PC5 protocol operation includes a performing physical (PC5-PHY) operation.

16. The method of claim 13, further comprising:
generate an internet protocol (IP) packet including the data;
processing the IP packet via proximity service (ProSe) (PC5) protocol stack operations prior to transmission of the IP packet to the second wireless communication device; and
receiving an IP address from the second wireless communication device, wherein the IP address identifies the first wireless communication device as originator of the IP packet, wherein generating the IP packet comprises including the IP address in the IP packet.

17. The method of claim 11, wherein selecting one of the set of data routing options includes selecting a layer 3 relay with a non-3$^{rd}$ Generation Partnership Project (3GPP) Interworking Function (N3IWF) routing option.

18. The method of claim 17, wherein the data routed via the layer 3 relay with N3IWF data routing option occurs over a protocol data unit (PDU) session with an N3IWF network device coupled to the network.

19. The method of claim 18, wherein the policy control information includes:
a session and service continuity (SSC) mode specifying that an IP address identifying the first wireless communication device per the PDU session is to be preserved;
a network slice selection (NSS) identifying one or more network slices over which the PDU session is taking place;
a data network name (DNN) identifying the PDU session; and
an access type preference identifying the layer 3 relay with N3IWF data routing option.

20. The method of claim 11, wherein the policy control information includes an access type preference identifying the layer 2 relay routing option.

21. The method of claim 11, further comprising accessing a user equipment route selection policy (URSP), and selecting one of the set of data routing options based on the URSP.

22. The method of claim 11, further comprising accessing a user equipment route selection policy (URSP) route selection descriptor (RSD), and selecting one of the set of data routing options based on the URSP RSD.

23. A first wireless communication device, comprising:
one or more memories; and
one or more processors coupled to the one or more memories, wherein the one or more processors are configured to cause the first wireless communication device to:

establish a protocol data unit (PDU) session with a network for relaying data received from a second wireless communication device based on policy control information;

receive data from the second wireless communication device outside of the PDU session; and transmit the data to a network entity coupled to the network via the PDU session.

24. The first wireless communication device of claim 23, wherein the policy control information includes:

a session and service continuity (SSC) mode specifying a service continuity for the PDU session;

a network slice selection (NSS) identifying one or more network slices over which the PDU session is taking place; and a data network name (DNN) identifying the PDU session.

25. The first wireless communication device of claim 23, wherein the one or more processors are configured to cause the first wireless communication device to receive the data from the second wireless communication device outside of the PDU session.

26. The first wireless communication device of claim 25, wherein the one or more processors are configured to cause the first wireless communication device to:

process the data received from the second wireless communication device via layers 1, 2, and 3 proximity service (ProSe) (PC5) protocol stack operations; and process the data for transmission to the network entity via layers 1, 2, and 3 new radio (NR) protocol stack operations.

27. The first wireless communication device of claim 25, wherein the one or more processors are configured to cause the first wireless communication device to:

process the data received from the second wireless communication device via layers 1 and 2 proximity service (ProSe) (PC5) protocol stack operations; and process the data for transmission to the network entity via layers 1 and 2 new radio (NR) protocol stack operations.

28. A method for wireless communication implemented at a first wireless communication device, the method comprising:

establishing a protocol data unit (PDU) session with a network for relaying data received from a second wireless communication device based on policy control information;

receiving data from the second wireless communication device outside of the PDU session; and transmitting the data to network entity to the network via the PDU session.

29. The method of claim 28, wherein the policy control information includes:

a session and service continuity (SSC) mode specifying a service continuity for the PDU session is to be preserved;

a network slice selection (NSS) identifying one or more network slices over which the PDU session is taking place; and a data network name (DNN) identifying the PDU session.

30. The method of claim 28, wherein receiving the data from the second wireless communication device occurs outside of the PDU session.

31. The method of claim 30, further comprising:

processing the data received from the second wireless communication device via layers 1, 2, and 3 proximity service (ProSe) (PC5) protocol stack operations; and processing the data for transmission to the network entity via layers 1, 2, and 3 new radio (NR) protocol stack operations.

32. The method of claim 30, further comprising:

processing the data received from the second wireless communication device via layers 1 and 2 proximity service (ProSe) (PC5) protocol stack operations; and processing the data for transmission to the network entity via layers 1 and 2 new radio (NR) protocol stack operations.

* * * * *